United States Patent [19]
Luedeke et al.

[11] Patent Number: 5,305,555
[45] Date of Patent: Apr. 26, 1994

[54] BELT GRINDING ASSEMBLY HAVING PIVOTING MEANS

[75] Inventors: Arthur P. Luedeke, Marine on St. Croix; Bradley W. Keller, Lino Lakes; Robert P. Miller, White Bear Lake, all of Minn.

[73] Assignee: Minnesota Mining and Manufacturing Company, St. Paul, Minn.

[21] Appl. No.: 930,192

[22] Filed: Aug. 12, 1992

Related U.S. Application Data

[63] Continuation-in-part of Ser. No. 686,774, Apr. 17, 1991, abandoned, which is a continuation-in-part of Ser. No. 638,047, Jan. 7, 1991, Pat. No. 5,165,204, which is a continuation-in-part of Ser. No. 359,729, May 31, 1989, Pat. No. 5,140,775.

[51] Int. Cl.$^5$ .............................................. B24B 21/00
[52] U.S. Cl. ................................. 51/145 T; 51/237 T; 51/135 R
[58] Field of Search ............... 51/145 T, 134, 237 T, 51/53, 108 R, 118, 145 R, 137, 135 R, 328; 29/33 R, 33 J, 33 S, 33 Q, 33 P, 33 T, 563, 564, 35.5, 38 R, 37

[56] References Cited

U.S. PATENT DOCUMENTS

| | | | |
|---|---|---|---|
| 1,537,697 | 5/1925 | Roberts | 51/134 |
| 1,817,554 | 8/1931 | Griswold . | |
| 2,110,931 | 3/1938 | Dyer et al. | 51/103 |
| 2,138,264 | 11/1938 | Warner . | |
| 2,156,453 | 5/1939 | Hamilton et al. . | |
| 2,406,728 | 8/1946 | Wharton | 51/145 T |
| 2,484,583 | 10/1949 | Paulson | 51/134 |
| 2,546,504 | 3/1951 | Head | 51/217 |
| 2,554,079 | 5/1951 | Wilson | 51/76 |
| 2,695,479 | 11/1954 | Indge | 51/134 |
| 2,814,919 | 12/1957 | Jones et al. . | |
| 2,990,659 | 7/1961 | Benkovich et al. . | |
| 3,322,434 | 5/1967 | McClung et al. . | |
| 3,526,062 | 9/1970 | Sommer | 51/108 |
| 3,651,603 | 3/1972 | Patch | 51/216 R |
| 3,670,458 | 6/1972 | Faure | 51/135 R |
| 3,864,816 | 2/1975 | Brusch | 29/563 |
| 4,218,800 | 8/1980 | Przygocki | 51/90 |
| 4,272,088 | 6/1981 | Perry | 269/283 |
| 4,292,767 | 10/1981 | Fatula | 51/145 R |
| 4,399,988 | 8/1983 | De Shong | 269/8 |
| 4,499,693 | 2/1985 | Fatula, Sr. et al. | 51/165.73 |
| 4,587,767 | 5/1986 | Giebmanns | 51/101 R |
| 4,833,831 | 5/1989 | Armstrong, Jr. | 51/34 R |

FOREIGN PATENT DOCUMENTS

0400901A1 12/1990 European Pat. Off. .
643011 3/1937 Fed. Rep. of Germany .
1945499 6/1966 Fed. Rep. of Germany .

OTHER PUBLICATIONS

European Search Report dated Nov. 10, 1992.

*Primary Examiner*—M. Rachuba
*Attorney, Agent, or Firm*—Gary L. Griswold; Walter N. Kirn; Jeffrey J. Hohenshell

[57] ABSTRACT

The belt grinding assembly according to the present invention includes (1) a frame (2) a belt grinding mechanism comprising a continuous abrasive belt having a backing with front and rear surfaces, and abrasive granules attached along the front surface; a mechanism for driving the abrasive belt in a first direction along a path relative to the frame; (3) a backup having a support surface for the belt along the path; which support surface is straight in the first direction and has a uniform shape corresponding to the shape of the edge surface in a direction at a right angle to the first direction; (4) a wheel having a periphery, a wheel axis at a right angle to the first direction; a mechanism mounting the wheel on the frame for rotation about the wheel axis; drive mechanism for rotating the periphery of the wheel past a loading station relative to the frame, and then past the support surface at a generally uniform rate of speed and in a first rotational direction; and (5) a plurality of pivoting engagement mechanisms for releasably engaging and holding a wrench during a grinding process.

28 Claims, 15 Drawing Sheets

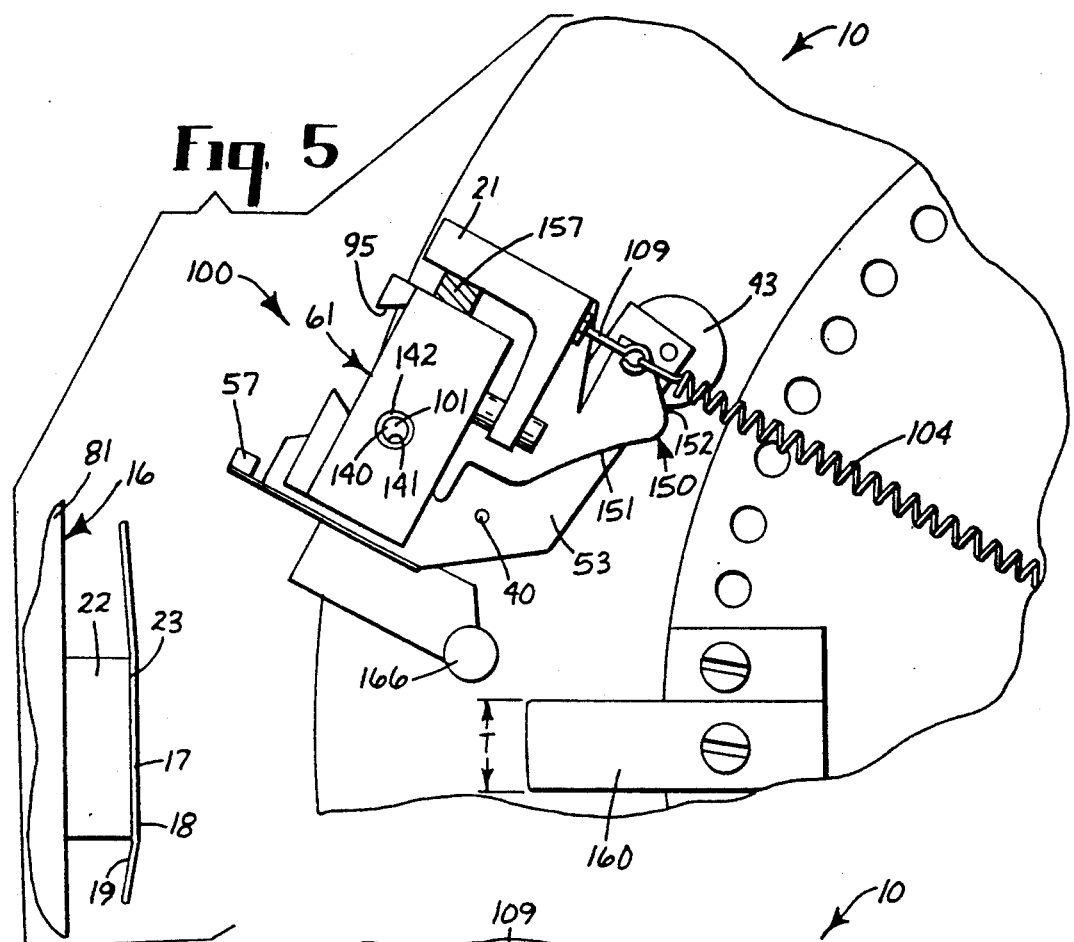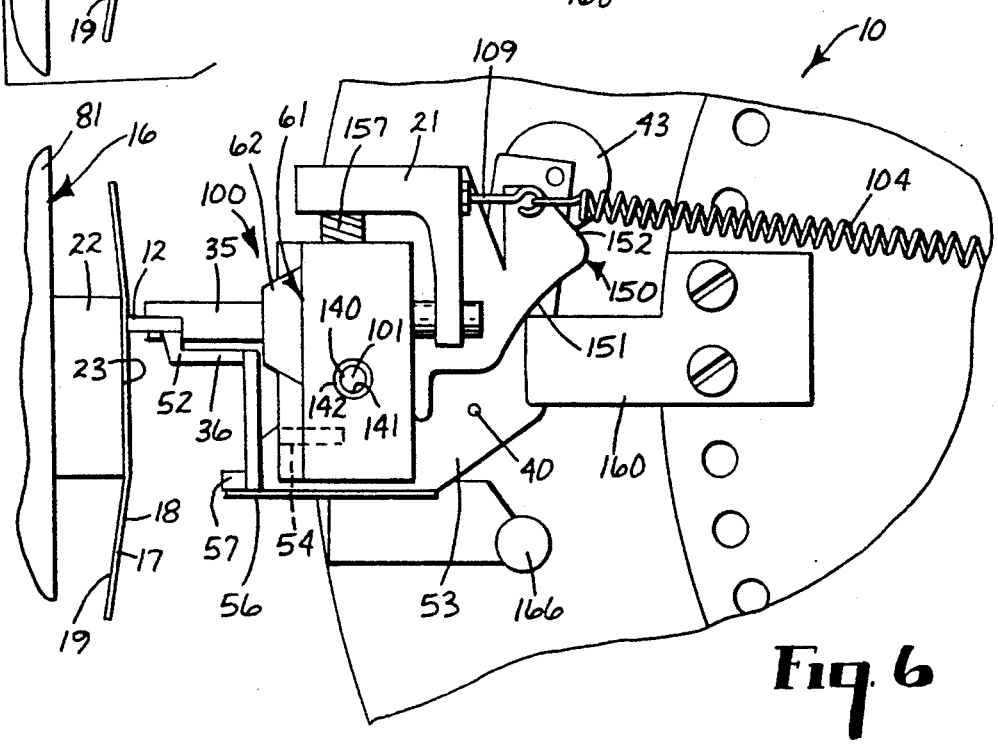

BELT GRINDING ASSEMBLY HAVING PIVOTING MEANS

CROSS REFERENCE TO RELATED APPLICATIONS

This application is a continuation-in-part of application Ser. No. 07/686,774, filed Apr. 17, 1991, now abandoned which is a continuation-in-part of application Ser. No. 07/638,047, filed Jan. 7, 1991, now U.S. Pat. No. 5,165,21 which is a continuation-in-part of U.S. application Ser. No. 07/359,729, filed May 31, 1989 now U.S. Pat. No. 5,140,775, the entire contents of each of the above mentioned documents are herein expressly incorporated by reference.

TECHNICAL FIELD

The present invention relates to belt grinding assemblies adapted for use in grinding a smooth arc on an edge surface extending between major side surfaces on an elongate bar or object such as a wrench, which edge surface has a predetermined shape that may not be linear along the length of the bar or wrench.

BACKGROUND OF THE INVENTION

Belt grinding assemblies are known that are adapted for use to grind a smooth arc on an edge surface extending between major side surfaces on an object or elongate bar such as a wrench, which edge surface has a predetermined shape when viewed in the planes of the major surfaces that may or may not be linear along the length of the wrench. Such grinding assemblies are useful to change an original rough or irregular edge surface resulting from the method by which the wrench was formed (e.g., drop forging) into a smoothly arced edge surface that is more aesthetically pleasing and easier on the hand of user of the wrench than the original rough or irregular edge surface. One such grinding assembly comprises the combination of (1) a belt grinding assembly including a drive mechanism for driving an abrasive belt in a first direction along a path past a backup platen fixed to frame means for the assembly, which platen has a support surface for the abrasive belt adjacent its rear surface that is straight in direction of travel of the belt and has a uniform shape corresponding to the shape of the edge surface to be radiused in a direction at a right angle to the direction of travel of the belt; and (2) bar manipulating means for moving the edge surface of the bar along an arcuate path about an axis at a right angle to the direction of travel of the belt into forceful engagement with the abrasive coated surface of the belt along the support surface to form the radius on the bar.

In this known belt grinding assembly the bar manipulating means is provided by a conveyor including a conveyor belt formed by two parallel spaced endless lengths of roller chain, metal slats extending transversely between opposite chain links, and receptacles for the bars attached to the slats on the sides of the slats opposite the lengths of chain; and a drive mechanism for the belt including two parallel spaced axles each carrying two axially spaced sprockets around which the chains were tensioned. Each of the receptacles is adapted to receive one of the bars therein with the length of the bar extending parallel to the slats and an edge surface of the bar projecting away from the slats, and the sprockets at one end of the conveyor are positioned so that movement of one of the receptacles around the sprockets on one of the axles will move a bar in the receptacle in an arc into forceful engagement with the abrasive belt along the support surface to grind a radius on the edge surface of the bar.

Another such grinding assembly comprises the combination of (1) a belt grinding assembly including a drive mechanism for driving an abrasive belt in a first direction along a path past a grinding station; and (2) bar manipulating means for moving the edge surface of the bar along an arcuate path about an axis at a right angle to the direction of travel of the belt into forceful engagement with the abrasive coated surface of the belt at the grinding station to form the radius on the bar; the bar manipulating means being provided by a drum having receptacles for the bars attached to its periphery; and a chain drive mechanism for the drum. Each of the receptacles is adapted to receive one of the bars therein with the length of the bar extending parallel to the axis of the drum and an edge surface of the bar projecting away from the slats, and the drum is positioned so that movement of one of the receptacles around its periphery will move a bar in the receptacle in an arc into forceful engagement with the abrasive belt along the support surface to grind a radius on the edge surface of the bar.

While such grinding assemblies can grind a radius on the side surface of a bar or wrench, they present several problems. Looseness of the bar in the holder, between the conveyor belt and the sprockets, or in the chain drive allows the bar to momentarily not be moved by the drive mechanism as the bar is initially brought into engagement with the abrasive belt along the support surface, after which the drive mechanism does move the bar into forceful engagement with the abrasive belt until the bar is positioned along the support surface so that the force of such engagement is directed to move the bar with the belt, whereupon such looseness allows the bar to move with the belt, resulting in movement of the bar too quickly out of engagement with the abrasive belt along the support surface. The result of such engagement between the bar and the belt is to produce a ground edge surface on the bar that is not uniform in that too much metal is removed from the portion of the bar that initially engages the belt, and too little metal is removed from the portion of the bar that is in final engagement with the belt. Also, the bar or wrench can fall free of the holders as it moves out of engagement with the belt, which can be dangerous.

A problem associated with the grinding assemblies described in U.S. application Ser. No. 07/359,729, filed May 31, 1989 or EPO Patent Application 0400901 is that such grinding assemblies tend to have difficulty in grinding small arcs (e.g. less than 1.0 inch radius on 0.25 inch thick edges of wrenches) on objects. For such a grinding assembly, the wheel should have a sufficiently large radius so that a number of tool receptacles may be placed on the periphery of the wheel. Generally, the larger the radius of the wheel, the greater the number of tool receptacles may be placed on the periphery of the wheel and the slower the speed of the periphery of the wheel per the number of objects ground. However, as the radius of the wheel increases, the arc in which the receptacles move the workpieces into forceful engagement with the abrasive belt along the support surface becomes "flatter". The resultant radius ground on the object is relatively large and thus, such devices tend to grind an undesirably large radius on the edge surface of the wrench or workpiece which results in a wrench with an insufficiently smooth edge which may be rough on the hands of a user and less aesthetically pleasing.

DISCLOSURE OF INVENTION

The present invention provides a belt grinding assembly that can grind a relatively small, uniformly arced edge surface (e.g. a 0.25 inch radius on a 0.25 inch thick edge of a wrench) extending between major side surfaces on an elongate bar such as a wrench, which edge surface has a predetermined shape that may or may not be linear along the length of the bar or wrench.

The belt grinding assembly according to the present invention includes (1) frame means; (2) a belt grinding mechanism comprising a continuous abrasive belt having a backing with front and rear surfaces, and abrasive granules attached along the front surface; means for driving the abrasive belt in a first direction along a path relative to the frame; (3) a backup having a support surface for the belt along the path; which support surface is straight in the first direction and has a uniform shape corresponding to the shape of the edge surface in a direction at a right angle to the first direction; (4) a wheel having a periphery, a wheel axis at a right angle to the first direction, and a wheel radius defined from the wheel axis; means mounting the wheel on the frame means for rotation about the wheel axis; drive means for rotating the periphery of the wheel past a loading station relative to the frame means, and then past the support surface at a generally uniform rate of speed and in a first rotational direction; and (5) a plurality of object holder assemblies having radially outward and inward sides, each object holder assembly including engagement means for releasably engaging and holding an object along the radially outward side.

The object holder assemblies each include pivotal mounting mechanisms for mounting the object holder assemblies about object holder assembly axes that are parallel to the axis of the wheel and which are spaced about the periphery of the wheel. The pivotal mounting mechanisms mount each of the object holder assemblies with the engagement means projecting radially outwardly of the wheel for pivotal movement about the object holder axis between pre-grinding and post-grinding positions with pivotal movement of the object holder assembly from the pre-grinding to the post-grinding position being generally in the first rotational direction of the wheel.

The grinding assembly may include a biasing means for biasing each object holder assembly toward the pre-grinding position in the form of a plurality of springs each having a pair of ends, with one end of each of the coil springs attached to a position on the wheel generally adjacent the wheel axis and with the other end of the coil springs being attached to the radially inward side of an object holder assembly.

The grinding assembly includes pivoting cam means mounted on the frame generally adjacent the support surface for pivoting each object holder assembly from the pre-grinding position to the post-grinding position against the bias of the biasing means (springs) during movement of the object holder assembly past the backup means to bring an object into forceful engagement with the abrasive belt along the support surface so that a radius smaller than the radius of the wheel may be ground on the object. The pivoting cam means preferably comprises a cam bar fixedly mounted on the frame and adapted to engage the pivotal mounting means.

Preferably, movement of the edge surface of the object along an arcuate path into forceful engagement with the abrasive belt at a generally uniform rate of speed is facilitated by the drive means comprising a helical gear coaxial with the wheel and having a diameter dimension of within 25 centimeters (10 inches) of the diameter dimension of the wheel, a driving worm gear having an axis at a right angle to the axis of the helical gear and engaged with the helical gear, means for mounting the worm gear for radial movement relative to the helical gear, and means for biasing the teeth of the worm gear into engagement with the teeth of the helical gear to restrict backlash between the gears.

Also preferably, each of the engagement means comprise a first jaw, and means for releasably attaching the first jaw to the radially outward side of the object holder assembly in a position fixed relative to the object holder assembly. The means for releasably attaching the first jaw to the radially outward side of the object holder assembly may comprise structural means on the radially outward side of each of the object holder assemblies defining a slot extending generally parallel to the wheel axis and having an inlet opening at one end. The first jaw has a base adapted for close fitting engagement in the slot, and means for releasably retaining the base in the slot. The slot is defined by a part of the peripheral surface of the object holder assembly and at least one side surface disposed at an acute angle relative to the periphery of the object holder assemblies. There may also be means for releasably retaining the base in the slot in the form of means for forcefully pressing the base against the side or bearing surface of the slot.

The engagement means also preferably comprise a second jaw, and jaw actuation means for mounting the second jaw on the object holder assembly for movement relative to the first jaw between a release position with the second jaw spaced freely from the first jaw to receive the object between the jaws, and an engage position adapted to firmly clamp the object between the jaws. The jaw actuating means preferably includes springs mounted on each of the object holder assemblies between the jaws for biasing the second jaw toward the engage position, and cam means including a jaw cam follower connected to the second jaw.

The belt grinding assembly may include release and loading cams mounted on the frame means and axially offset from the cam bar. The release and loading cams have cam surfaces positioned for engagement by the jaw cam follower to move the second jaw to the release position against the bias of the spring biasing the second jaw toward the engage position.

Each of the plurality of object holder assemblies preferably include leveling means comprising a leveling cam follower mounted on the radially inward side of the object holder assembly. The release and loading cams mounted on the frame means have surfaces positioned for engagement by the leveling cam follower to fix the object holder assembly relative to the wheel. As stated above, the release and loading cam surfaces are also positioned for engagement by the jaw cam follower to move the second jaw to the release position and to level the object holder assembly in a leveled position.

BRIEF DESCRIPTION OF DRAWING

The present invention will be further described with reference to the accompanying drawing wherein like reference numerals refer to like parts in the several views, and wherein:

FIGS. 5 through 8 are enlarged fragmentary side vertical views of a belt grinding assembly according to the present invention, which views have parts broken away to show details and which sequentially illustrate an object holder assembly being moved between the pre-grinding and the post-grinding positions;

FIGS. 15 through 18 are enlarged fragmentary side vertical views of the belt grinding assembly of FIG. 11, which views have parts such as a portion of the cam bar track broken away to show details, and which sequentially illustrate an engagement means as it is moved between the pre-grinding and the post-grinding positions wherein:

FIG. 15 illustrates the engagement means in a pre-grinding position;

FIG. 16 illustrates the engagement means as it brings a wrench into forceful engagement with an abrasive belt along a support surface so that a radius may be ground on the wrench;

FIG. 17 illustrates the engagement means just after it has brought the wrench into forceful engagement with the abrasive belt; and FIG. 18 illustrates the engagement means in a post-grinding position.

DETAILED DESCRIPTION

Figure 1:
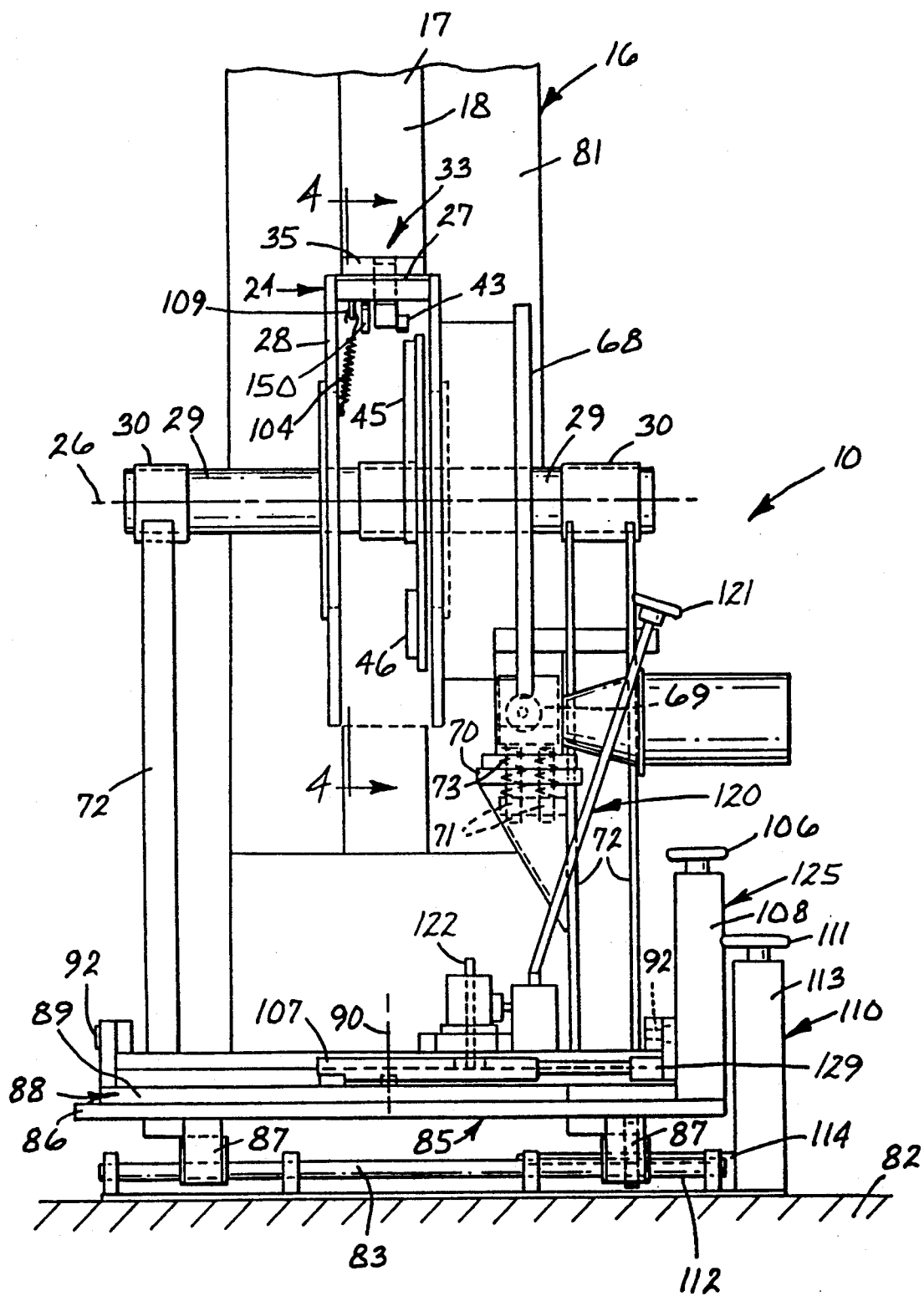
FIG. 1 is a fragmentary front vertical view of a belt grinding assembly according to the present invention, which view has parts broken away to show details.

Referring now to the drawing, there is shown a belt grinding assembly 10 adapted for use on an elongate bar such as a wrench 12 illustrated having opposite major side surfaces and an initial edge surface 14 between the side surfaces that is rough and has a predetermined shape when viewed in the planes of the major surfaces that may not be linear along the length of the wrench 12. The grinding assembly 10 is adapted to grind a relatively small, uniformly arced edge surface (e.g. a 0.25 inch radius on a 0.25 inch thick edge of a wrench) extending between major side surfaces on the wrench 12 to form a new edge surface extending between the side surfaces that is smoothly arced while retaining the predetermined shape along the length of the wrench 12.

Figure 2:
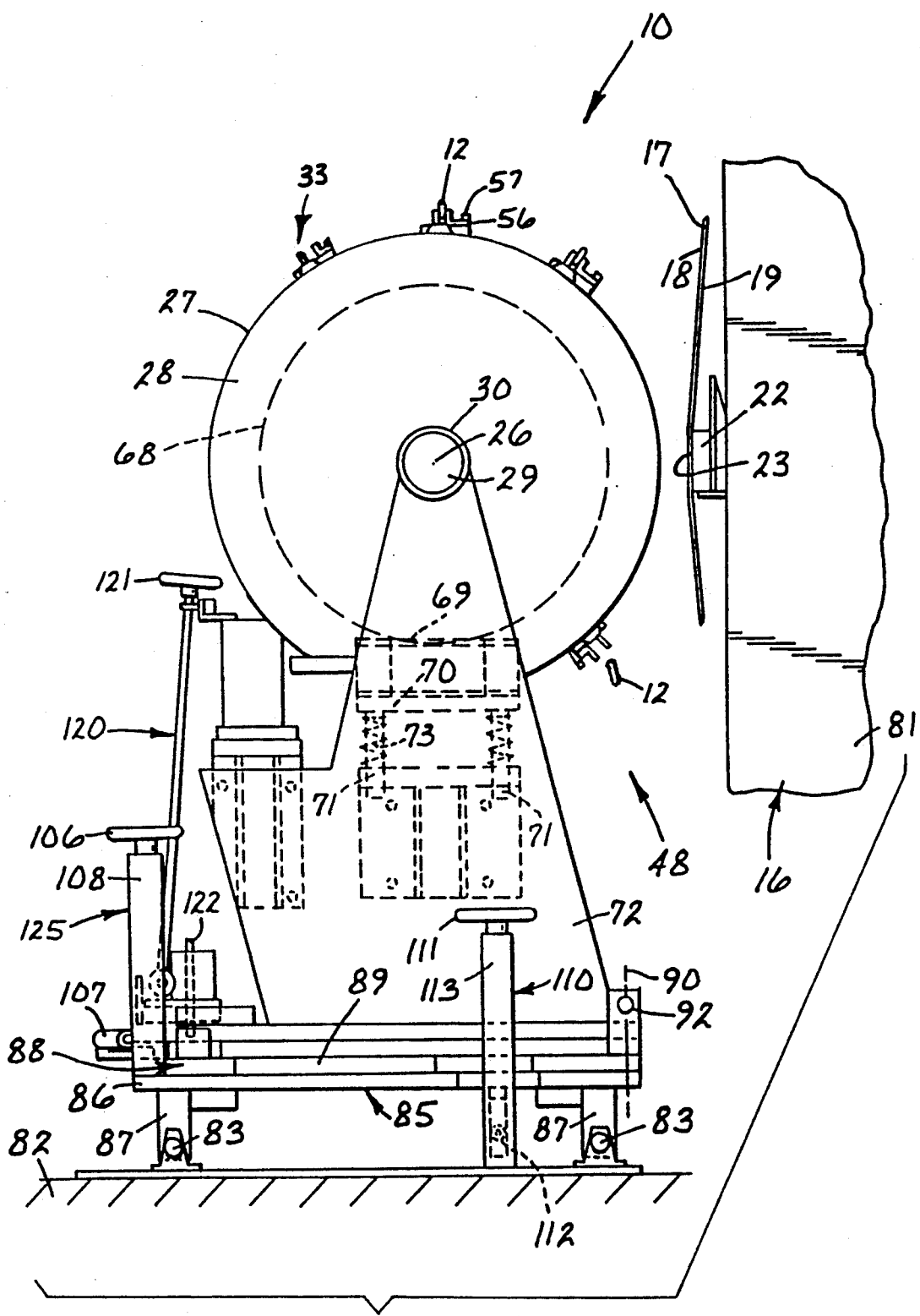
FIG. 2 is a fragmentary side vertical view of a belt grinding assembly according to the present invention.
Figure 3:
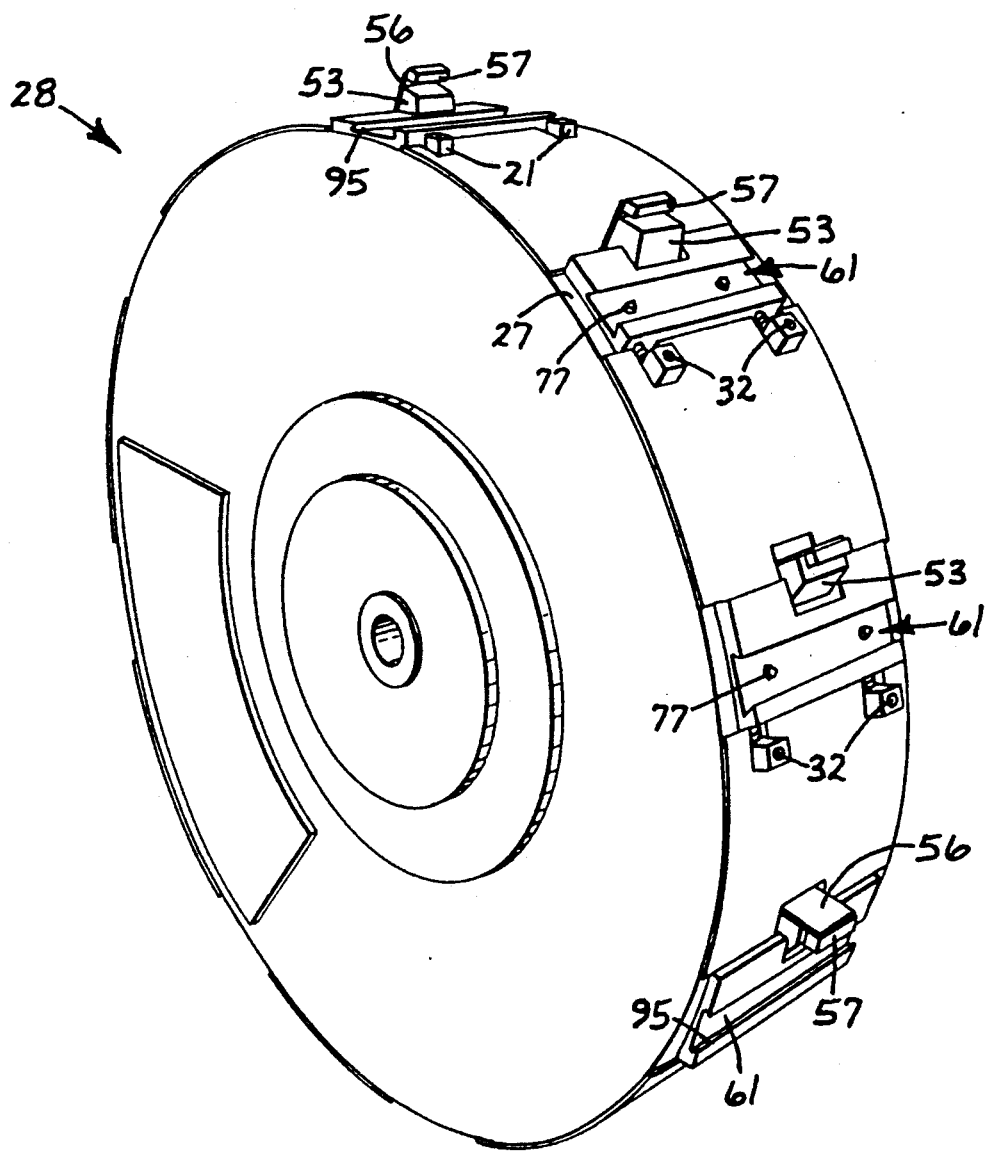
FIG. 3 is a perspective view of a wheel according to the present invention with portions omitted to show detail.
Figure 4:
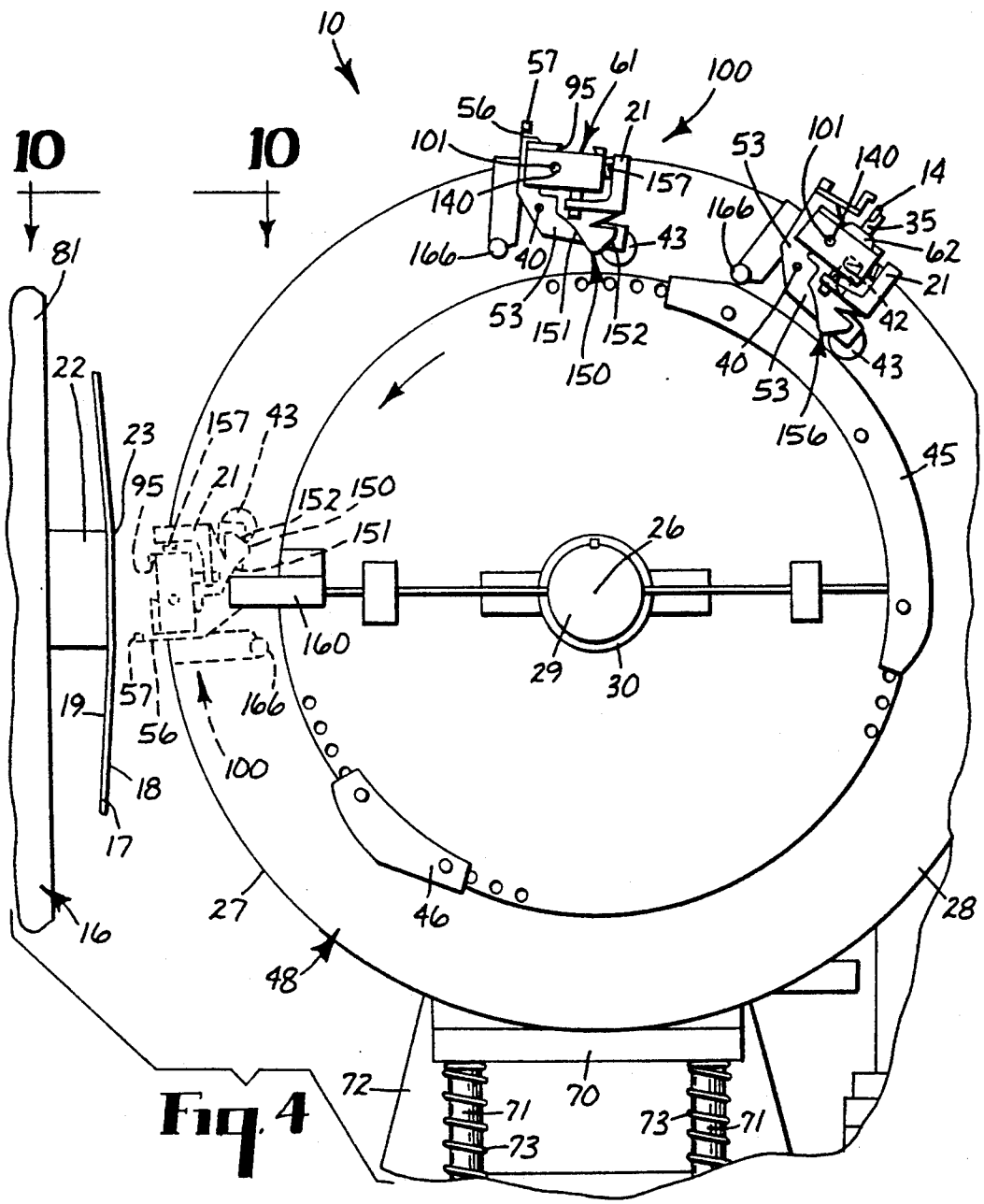
FIG. 4 is an enlarged fragmentary side vertical view of a belt grinding assembly according to the present invention, taken approximately along lines 4—4 of FIG. 1, which view has parts broken away to show details.
Figure 7:
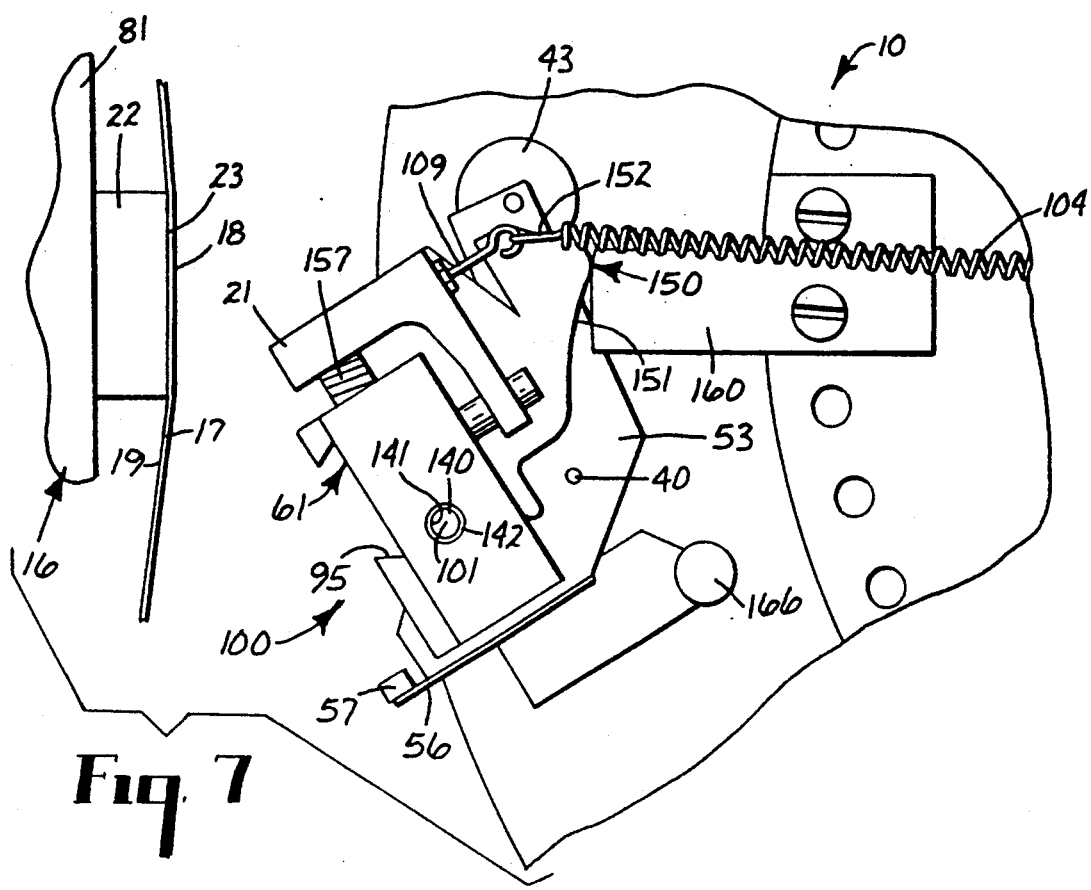

Generally the belt grinding assembly 10 comprises frame means; (2) machining means such as a belt grinding mechanism comprising a belt driving mechanism 16 comprising a conventional continuous abrasive belt 17 having a flexible cloth backing with front and rear surfaces 18 and 19, and abrasive granules attached along its front surface 18 (e.g., the abrasive belt sold by Minnesota Mining and Manufacturing Company, St. Paul, Minn., under the trade designation 3M 331D "Three-Mitell T.M. Resin Bond Cloth Belts), means for driving the abrasive belt 17 in a first direction along a path relative to frame means for the assembly 10 in the form of a conventional belt drive mechanism (not shown) including spaced rollers around which the abrasive belt 17 is tensioned and a motor drive assembly that drives the rollers and thereby the abrasive belt 17 (e.g. The vertical slack belt machines sold by KLK Industries, Crystal, Minn., or G & P Industries, Indianapolis, Ind.); a backup platen 22 fixed to the frame means and having a support surface 23 along the path adjacent the rear surface 19 of the abrasive belt 17, which support surface 23 is straight in the first direction in which the abrasive belt 17 is driven (see FIGS. 2 and 4) and has a uniform shape corresponding to the shape of the edge surface 14 in a direction at a right angle to the first direction in which the abrasive belt 17 is driven (see FIG. 10); and workpiece feed means for moving the edge surface 14 of the wrench 12 at a generally uniform rate of speed along an arcuate path about axes 26 and 101 which are at right angles to the first direction in which the abrasive belt 17 is driven into forceful engagement with the abrasive belt 17 along the support surface 23.

The workpiece feed means or mechanism preferably comprises a wheel 28 having axis 26, a generally cylindrical periphery 27; means in the form of an axle 29 for the wheel 28 journaled in bearings 30 on the frame means. The axle 29 mounts the wheel 28 on the frame means for rotation about the axis 26 at a right angle to the first direction in which the abrasive belt 17 is driven to sequentially move the periphery 27 of the wheel 28 past a loading station 33 relative to the frame means, and then past the support surface 23 of the platen 22. There is also present drive means for rotating the periphery 27 of the wheel 28 past the support surface 23 of the platen 22 at a uniform rate of rotation.

The belt grinding assembly 10 includes a plurality of object holder assemblies 100 (FIGS. 4 through 8) having radially outward and inward sides, each object holder assembly 100 including engagement means for releasably engaging and holding a wrench 12 along its radially outward side.

Each of the object holder assemblies 100 include pivotal mounting means or mechanisms for mounting the object holder assemblies about object holder assembly axes 101 that are generally parallel to the axis 26 of the wheel 28 and which are spaced about the periphery of the wheel 28. The pivotal mounting means preferably comprises a cylindrical axle 140 positioned within and coaxial with a cylindrical bushing 142 mounted in a cylindrical bore 141 in the object holder assembly 100. The pivotal mounting mechanisms mount each of the object holder assemblies 100 with the engagement means projecting radially outward of the wheel 28 for pivotal movement about the object holder axes 101 between pre-grinding (FIG. 5) and post-grinding (FIG. 7) positions relative to the wheel 28. The pivotal movement of the object holder assembly 100 from the pre-grinding to the post-grinding position is generally in the first rotational direction of the wheel 28.

Figure 9:
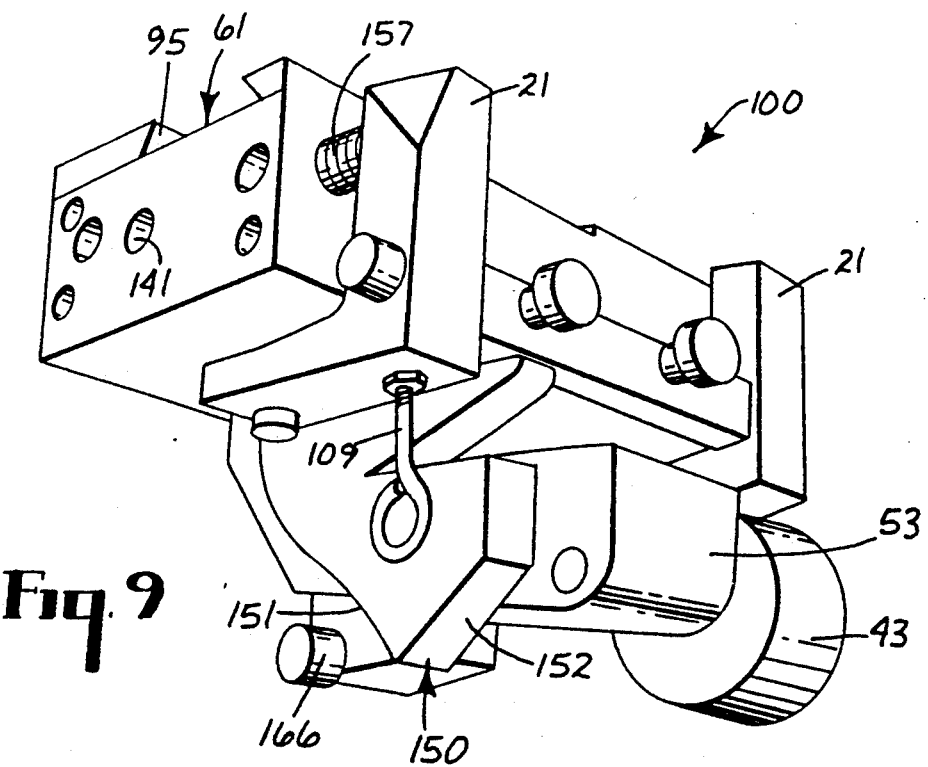
FIG. 9 is an enlarged perspective view of portions of an object holder assembly according to the present invention.

The pivotal mounting means also preferably comprises generally V-shaped cam followers 150 mounted on inner portions of each of the object holder assemblies 100 (FIG. 9). The V-shaped cam followers 150 have leading 151 and trailing 152 portions which have surfaces adapted to engage pivoting cam means (to be explained later) to pivot the object holder assembly 100 from the pre-grinding to the post-grinding position to thereby bring the wrench 12 into forceful engagement with the abrasive belt 17 along the support surface 23.

Optionally, the grinding assembly 10 may include a biasing means for biasing each object holder assembly 100 toward the pre-grinding position in the form of springs 104 each having a pair of ends, with one end of each of the coil springs 104 attached to a position on the wheel 28 generally adjacent the wheel axis 26 and with the other end of the coil springs 104 being attached to the radially inward side of an object holder assembly 100 by means of, for example, an eyelet 109.

Additionally, the grinding assembly 10 includes pivoting cam means attached to the frame means generally adjacent the support surface 23 for pivoting each object holder assembly 100 from the pre-grinding position to the post-grinding position against the bias of the biasing means (springs 104) during movement of the object holder assembly 100 past the back-up platen 22 to bring an object such as wrench 12 into forceful engagement with the abrasive belt 17 along the support surface 23 so that a radius smaller than the radius of the wheel 28 may be ground on the wrench 12. The pivoting cam means preferably comprises a cam bar 160 fixedly mounted on the frame means and adapted to engage the leading and trailing surfaces 151 and 152 of the V-shaped cam follower 150 of the pivotal mounting means.

The leading surface 151 of the V-shaped cam follower 150 is preferably arcuate and is adapted to engage cam bar 160 as the object holder assembly 100 moves past the backup platen 22. Engagement between the cam bar 160 and the leading 151 and trailing 152 surfaces of V-shaped cam follower 150 causes the object holder assembly 100 to pivot about axis 101 as the assembly 100 moves past the backup platen 22. Pivoting the object holder assembly 100 at this location affords grinding a smaller radius along the edge of the wrench 12 than would be ground without the pivoting of the object holder assembly 100.

Figure 8:
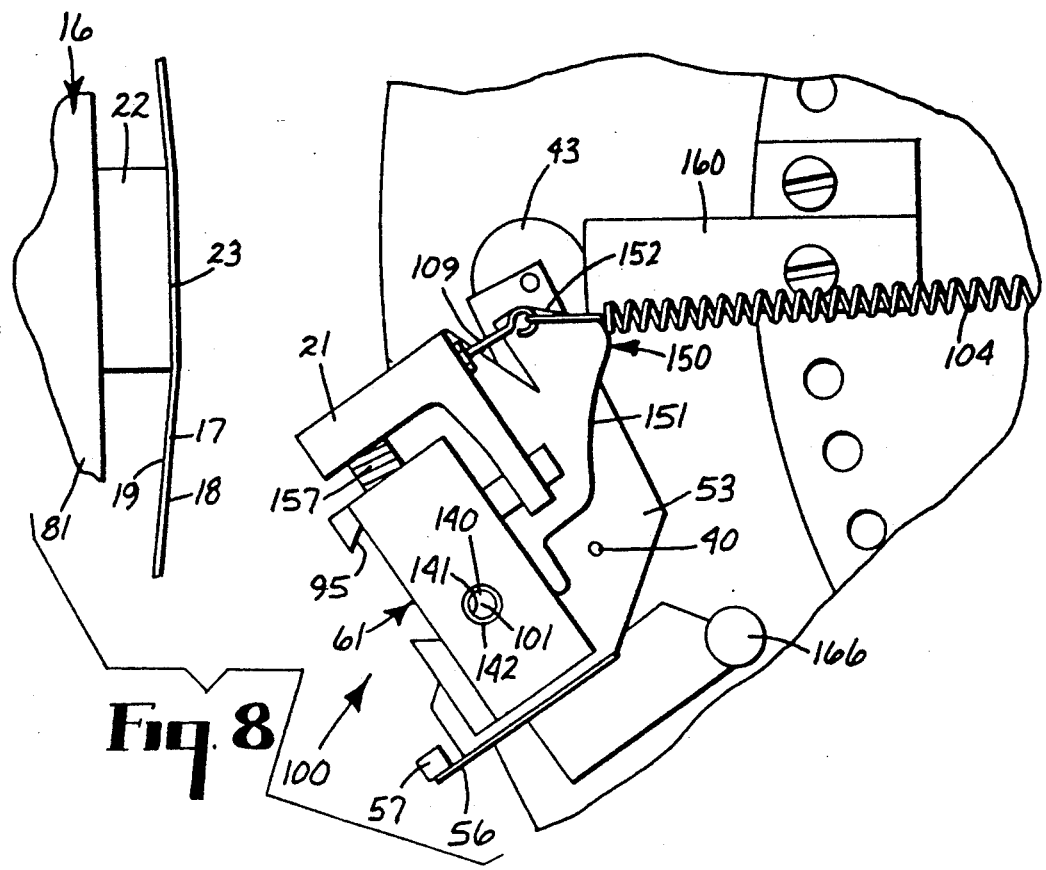

As best seen in FIG. 8, after the V-shaped cam follower 150 moves past the cam bar 160, the spring 104 urges the object holder assembly 100 back into a pre-grinding position relative to the periphery of the wheel 28. A 1.5 inch thickness T of the cam bar 160 ensures that the spring 104 does not cause the object holder 100 to pivot the wrench 12 back into engagement with the belt 17 after the edge of the wrench 12 has been ground. Also, supplying the trailing portion 152 to the V-shaped cam follower 150 ensures that the wrench 12 will slowly and smoothly move toward the pre-grinding position from the post grinding position and thus prevents the wrench 12 from being thrown from the engagement means (e.g. jaws 35 and 36).

First and second spaced jaws 35 and 36 are mounted on the wheel 28 in spaced relationship about its periphery 27. The engagement means comprises the first jaw 35, means for releasably attaching the first jaw 35 to the radially outward side of the object holder assembly 100 in a position fixed relative to the object holder assembly 100; the second jaw 36, and jaw actuation means (later to be explained) for mounting the second jaw 36 on the object holder assembly 100 for movement relative to the first jaw 35 between a release position (see the jaws 35 and 36 at the loading station 33) with the jaws 35 and 36 spaced to freely receive a wrench 12 between the jaws 35 and 36, and an engage position (see the jaws adjacent the platen 22) adapted to firmly clamp the wrench 12 between the jaws 35 and 36, and means for positioning the jaws 35 and 36 in their engage position as each object holder assembly 100 moves past the support surface 23 of the platen 22.

For each pair of jaws 35 and 36, the first jaw 35 is releasably attached to the radially outer surface of the object holder assembly 100 in a fixed position relative to the object holder assembly 100 by means later to be explained. The second jaw 36 is mounted on the object holder assembly 100 by means including a pivot pin 40 (FIG. 6) for pivotal movement relative to the object holder assembly 100 between the release and the engage positions.

The jaw actuating means includes a spring 42 (FIGS. 4 and 10) between the first jaw 35 and the second jaw 36 for biasing the second jaw 36 toward the engage position of the jaws 35 and 36, and cam means including a cylindrical jaw cam follower 43 mounted on the second jaw 36 for rotation about an axis parallel to the axis 26 of the wheel 28, and first (e.g. a loading) and second (e.g. release) cams 45 and 46 mounted on the frame means. The cams 45 and 46 have cam surfaces positioned for engagement by the jaw cam followers 43 to position the second jaws 36 in the release positions of the jaws 35 and 36 when the pairs of jaws 35 and 36 are at the loading station 33 preceding the platen 22 or at an unloading station 48 subsequent to the platen 22 and fixed relative to the frame means along the lowermost portion of the wheel 28. The pairs of jaws 35 and 36 are moved from the release position at the loading station 33 to the engaged position. In the engaged position, the jaws 35 and 36 are moved past the support surface 23 of the platen 22 and then to unloading station 48 where they are again moved to the release position and the finished wrench 12 is dropped into a receptacle (not shown).

Figure 10:
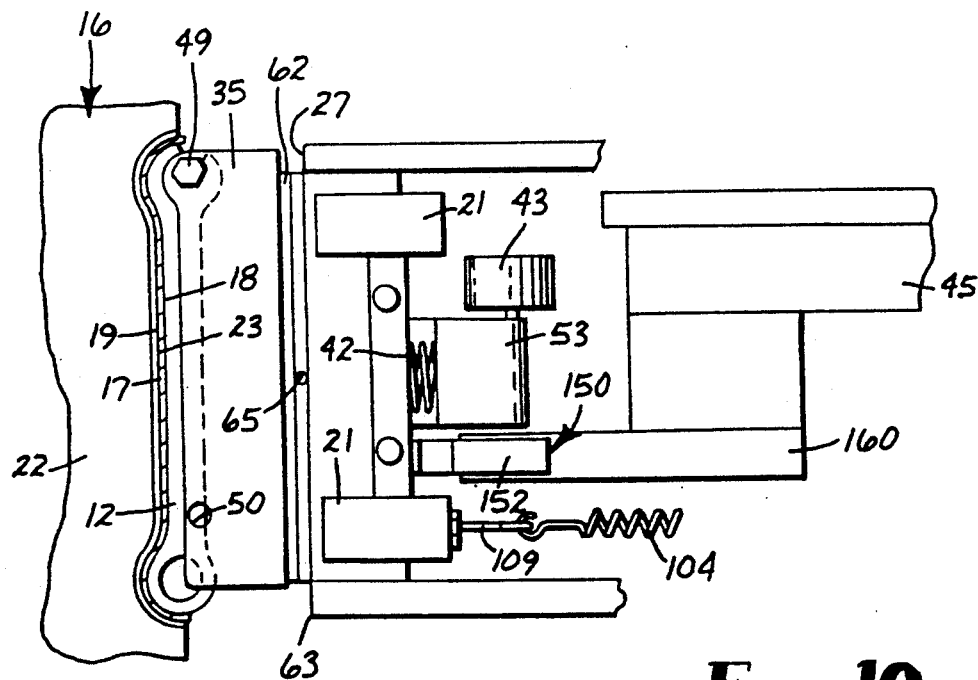
FIG. 10 is an enlarged fragmentary sectional view taken approximately along lines 10—10 of FIG. 4.

As can best be seen in FIGS. 6 and 10, each pair of jaws 35 and 36 is shaped to position the wrench 12 at a predetermined position there between, such as through the use of a pin 49 received between jaws of the wrench 12 and a pin 50 for supporting the edge surface of the wrench 12 opposite the edge surface 14 being radiused by the belt 17. Different shaped jaws 35 and 36 may thus be required for different shaped wrenches, and the use of such different shaped jaws is facilitated by the means for releasably attaching the first jaw 35 described below, and means for changing a minor contact portion 52 of the second jaw 36 that is shaped to engage a particular wrench or other bar. That means for changing the contact portion 52 of the movable jaw 36, best seen in FIGS. 4 and 6, comprises the second jaw 36 having a major portion 53 pivotably mounted on the pivot pin 40 and on which major portion 53 the jaw cam follower 43 is mounted, which major portion 53 has a pivotable support pin 54 projecting generally centrally and radially of the wheel 28, on which pivotable support pin 54 the minor contact portion 52 of the second jaw 36 is pivotably mounted. Pivotal movement of the minor contact portion 52 of the second jaw 36 around the pin 54 insures complete contact of the second jaw 36 with the wrench 12 between the jaws 35 and 36. The minor contact portion 52 of the second jaw 36 is retained in place on the pin 54 and against the major portion 53 by a leaf spring 56 having an end portion fixed on the major portion 53 of the second jaw 36, and carrying a lug 57 on its distal end adapted to engage over a lip on the minor contact portion 52 of the second jaw 36. When desired, the contact portion 52 can be easily replaced by a contact portion of a different shape by pulling the lug 57 out of the recess in the contact portion 52 of the second jaw 36 against the bias of the leaf spring 56, lifting the contact portion 52 off of the pin 54, positioning the new contact portion on the pin 54, and allowing the lug 57 to enter the recess in the new contact portion under the influence of the leaf spring 56 to retain it in place.

Each of the plurality of object holder assemblies preferably include leveling means comprising a leveling cam follower 166 mounted on the radially inward side of the object holder assembly 100. Release 46 and loading 45 cams mounted on the frame means have surfaces positioned for engagement by the leveling cam follower 166 to fix the object holder assembly 100 relative to the wheel 28 at the loading and unloading stations 33 and 48. The release and loading cam surfaces 45 and 48 are also positioned for engagement by the jaw cam follower 43 to move the second jaw 36 to the release position and to level the object holder assembly in a leveled position relative to the wheel 28 generally midway between the pre-grinding and the post-grinding positions (see FIG. 4) against the bias of the springs 104 at the loading and unloading stations 33 and 48. The leveling cam follower 166 and jaw cam follower 43 are axially offset (relative to the wheel axis 26) from the V-shaped cam follower 150 so that they do not engage the cam bar 160 when the object holder assembly 100 moves past the support surface 22. Placing the object holder assemblies 100 in the leveled position at the loading station 33 provides a convenient orientation for a user to place an unground wrench 12 between jaws 35 and 36. Placing the object holder assemblies 100 in the leveled position at the unloading station 48 affords a controlled, precise drop of a ground wrench 12 into a tool receptacle (not shown) positioned in a predetermined location relative to the wheel 28.

The portion of the engagement means comprising means for releasably attaching the first jaw 35 to the radially outward side of the object holder assembly 100 is described in U.S. patent application Ser. No. 07/638,047 which is herein incorporated by reference. That means may comprise structural means on the radially outward side of each of the object holder assemblies 100 defining a slot 61 extending generally parallel to the wheel axis 26 and having an inlet opening at one end. The first jaw 35 has a base 62 adapted for close fitting engagement in the slot 61, and means for releasably retaining the base 62 in the slot 61. The radially outward side of each of the object holder assemblies 100 has a peripheral surface. The slot 61 is defined by a part of the peripheral surface and at least one side side or bearing surface 95 disposed at an acute angle relative to the periphery of the object holder assembly 100. Preferably the slot 61 comprises a dovetail slot but may comprise a slot having only one side disposed an acute angle relative to the outer surface of the object holder assembly 100. The means for releasably retaining the base 62 in the slot 61 may include means for forcefully pressing the base 62 against side or bearing surfaces 95 of the slot 61.

The slot surfaces 61 include bearing surfaces 95 diverging on opposite sides of the opening. The base or plate 62 has surfaces defining a socket opening through the bottom of the plate 62 and has shoulder surfaces 98 adapted to engage the bearing surfaces 95. The means for forcefully pressing the base 62 against the bearing surfaces 95 of the slot 61 includes detent means 76 having detent surfaces 77 adapted to engage the surfaces defining the socket in the plate 62 to position the plate 62 at a predetermined location relative to the object holder assembly 100. The detent means 76 are mounted on the object holder assembly 100 for movement between a locking position with the detent surfaces 77 of the detent means 76 engaged with the socket surfaces in the plate 62, and a release position with the detent surfaces 77 of the detent means disengaged from the socket to afford sliding movement of the plate 62 within the slot 61.

A coil spring 157 may bias the detent surfaces 77 of the detent means 76 toward the locking position. The spring 157 also biases the shoulder surfaces 98 of the plate 62 radially outward from the axis 26 toward engagement with the bearing surfaces 95 on the periphery of the slot 61 to provide secure frictional engagement between the shoulder surfaces 98 of the plate 62 and the bearing surfaces 95 of the slot 61 to thereby firmly hold the plate 62 within the slot 61 while the new surface is formed on the object or workpiece.

The coil spring 157 has two opposite ends with one end engaged with an L-shaped actuation member 21 and with the other end of the spring engaged with the object holder assembly 100. The L-shaped actuation member 21 is an element of an actuation means which is provided for moving the detent means 76 from the locking position to the release position against the bias of the spring 157 and for overcoming the secure frictional engagement between the shoulder surfaces 98 of the plate 62 and the bearing surfaces 95 of the slot 61 to thereby afford quick changing of the plate 62 and the first jaw 35 with a different plate and first jaw. The actuation means affords release of the bias from the spring 157 before the plate 62 is slid axially into or out of slot 61.

The operation of the actuation means is described in U.S. patent application Ser. No. 07/638,047 and is herein incorporated by reference. At its radially outer or upper end, the L-shaped actuating arm 21 includes surfaces defining a pair of apertures 32 which are adapted to receive a manual operable means (not shown) such as a fork shaped bar having two tangs projecting from a handle for moving the detent means 76 from the locking to the release position to afford changing of the plate 62 and the first jaw 35 with a different plate and first jaw.

The backup platen 22, which has a uniform shape corresponding to the shape of the edge surface 14 in a direction at a right angle to the first direction in which the abrasive belt 17 is driven, may be changed for different shaped wrenches or bars, and thus is removably attached to the frame means by bolts (not shown). The support surface 23 of the platen 22 along the path adjacent the rear surface of the abrasive belt 17 is covered with an about $\frac{1}{8}$ inch thick layer of the graphite covered backing sold by Process Engineering Corporation, Crystal Lake, Ill., which facilitates sliding movement of the backing of the abrasive belt 17 along the fixed support surface 23 when the wrench 12 is pressed into forceful grinding engagement with the abrasive belt 17 moving over it. There may be an elastic resiliently deflecting material (e.g. foam rubber) behind the fixed support surface 23 which is adapted to conform to the shape of the wrench 12.

The wheel 28 has a predetermined diametrical dimension (e.g., 76 centimeters or 30 inches) at its periphery 27, and the drive means for rotating the periphery 27 of the wheel 28 past the support surface 23 of the platen 22 at a uniform rate of rotation comprises a helical gear 68 coaxial with and fixed to the wheel 28 (which helical gear 68 has diametrical dimension of about 61 centimeters or 24 inches, which is, as is preferred, within 25 centimeters or 10 inches of the diametrical dimension of the wheel 28), a worm gear 69 having an axis at a right angle to the axis 26 of the helical gear 68 and wheel 28, which worm gear 69 is engaged with the helical gear 68 and is driven by a variable speed motor (not shown), means for mounting the worm gear 69 for radial movement relative to the helical gear 68, and means for biasing the teeth of the worm gear 69 into close fitting engagement with the teeth of the helical gear 68 to restrict backlash between the gears 68 and 69. The means for mounting the worm gear 69 for radial movement relative to the helical gear 68 and the means for biasing the teeth of the worm gear 69 into engagement with the teeth of the helical gear includes a portion 70 of the frame means on which the worm gear 69 is rotatably mounted, which frame means portion 70 includes a plurality of parallel pins 71 projecting at a right angle to the axis of the worm gear 69 and received for longitudinal sliding movement in sockets in a portion 72 of the frame means on which the wheel 28 is mounted, and coil springs 73 around the pins 71 between the frame portion 72 on which the wheel 28 is mounted and the frame portion 70 on which the worm gear 69 is mounted.

Means in the form of relatively movable portions of the frame means and adjustable mechanisms between those portions are also provided for providing precise alignment between the wrench 12 in the jaws 35 and 36 and the support surface 23 so that the wrench 12 will be brought into the desired engagement with the abrasive belt 17 along the support surface 23 to form the desired radius on the edge surface 14. The relatively movable portions of the frame means include (1) a fixed portion comprising a frame 81 of the belt driving mechanism 16, a floor 82 on which the frame 81 is mounted in a fixed position, ana two parallel rail assemblies 83 supported in a fixed position on the floor 82; (2) a transversely movable portion 85 comprising a transversely movable plate 86 and four linear bearing assemblies 87 projecting from a bottom surface of the plate 86, which linear bearing assemblies 87 are mounted around the rail assemblies 83 for linear movement there along; a horizontally pivotable portion 88 comprising a horizontal pivot plate 89 laying in face to face contact with the upper surface of the transversely movable plate 86 and mounted by a bolt through the plates 86 and 89 for horizontal pivotal movement relative to the transversely movable plate 86 about a vertical pivot axis 90 closely adjacent to and generally centered on the abrasive belt 17; and the portion 72 which is vertically pivotable relative to the pivot plate 86 about a horizontal axis parallel to the axis 26 of the wheel 28 that is defined by pivot pins 92 through the vertically pivotable portion 72 and the horizontal pivot plate 89 on the sides thereof adjacent the abrasive belt 17.

An adjustment assembly 120 manually operable by a wheel 121 is mounted on the vertically pivotable portion 72 of the frame means and includes a screw jack portion including a threaded axially movable rod 122 having a lower end bearing against horizontal pivot plate 89 (e.g., the screw jack commercially designated a "Jaculator" T.M. available from Minnesota Bearing" St. Paul, Minn.). Rotation of the wheel 121 changes the length of the portion of the rod 122 that extends between the vertically pivotable portion 72 and the horizontal pivot plate 89, thereby causing vertical pivotal movement of the vertically pivotable portion 72 relative to the horizontal pivot plate 89 about the pivot pins 92 and changing the engagement between the edge surface 14 of the wrench 12 and the abrasive belt 17 on the support surface 23 along the entire length of the wrench 12.

An adjustment screw assembly 105 is manually operable by a wheel 106 connected to a shaft rotatably mounted in a bearing block 108 mounted on the transversely movable plate 86 of the frame means, which shaft is coupled by a universal joint 129 to an extendible or retractable rod assembly 107 having an end attached to the horizontal pivot plate 89. Rotation of the wheel 106 provides means for changing the length of the rod assembly 122 (i.e., by screwing a threaded rod portion thereof into or out of an internally threaded socket portion thereof) thereby causing horizontal pivotal movement of the the horizontal pivot plate 89 and the wheel 28 carried thereby about the vertical pivot axis 90 on the top surface of the transversely movable plate 86 to adjust the engagement of one end of the wrench 12 relative to the other with the abrasive belt 17 along the support surface 23.

An adjustment screw assembly 110 is manually operable by a wheel 111 connected to a shaft rotatably mounted in a bearing block 113 mounted on a plate fixed to the floor 82 on which the rail assemblies 83 are fixed, which shaft is coupled by a universal joint 114 to an extendible or retractable rod assembly 112 having an end attached to the transversely movable plate 86 of the frame means. Rotation of the wheel 111 provides means for changing the length of the rod assembly 112 (i.e., by screwing a threaded rod portion thereof into or out of an internally threaded socket portion thereof), thereby causing horizontal movement of the transversely movable plate 86 and the wheel 28 it supports through the pivotal portion 88 to adjust the area of contact between the wrench 12 and the abrasive belt 17 along the platen 22 in a direction parallel to the axis 26 of the wheel 28.

Referring now to FIGS. 11 through 18 of the drawing, there is shown a second embodiment of belt grinding assembly 210 for use on an elongate bar such as a wrench 212 illustrated having opposite major side surfaces and an initial edge surface 214 between the side surfaces that is rough and has a predetermined shape when viewed in the planes of the major surfaces that may not be linear along the length of the wrench 212. The grinding assembly 210 is adapted to grind a relatively small, uniformly arced edge surface (e.g. at least a 0.25 inch radius on a 0.25 inch thick edge of a wrench) extending between major side surfaces on the wrench 212 to form a new edge surface extending between the side surfaces that is smoothly arced while retaining the predetermined shape along the length of the wrench 212.

Generally the belt grinding assembly 210 comprises frame means; machining means such as a belt grinding mechanism comprising a belt driving mechanism 216 comprising a conventional continuous abrasive belt 217 having a flexible cloth backing with front and rear surfaces 218 and 219, and abrasive granules attached along its front surface 218 (e.g., the abrasive belt sold by Minnesota Mining and Manufacturing Company, St. Paul, Minn., under the trade designation 3M 331D "Three-M-itell T.M. Resin Bond Cloth Belts), means for driving the abrasive belt 217 in a first direction along a path relative to frame means for the assembly 210 in the form of a conventional belt drive mechanism (not shown) including spaced rollers around which the abrasive belt 217 is tensioned and a motor drive assembly that drives the rollers and thereby the abrasive belt 217 (e.g. The vertical slack belt machines sold by KLK Industries, Crystal, Minn., or G & P Industries, Indianapolis, Ind.); a backup platen 222 fixed to the frame means and having a support surface 223 along the path adjacent the rear surface 219 of the abrasive belt 217, which support surface 223 is straight in the first direction in which the abrasive belt 217 is driven and has a uniform shape corresponding to the shape of the edge surface 214 in a direction at a right angle to the first direction in which the abrasive belt 217 is driven; and workpiece feed means for moving the edge surface 214 of the wrench 212 at a generally uniform rate of speed along an arcuate path about axes 226 and 301 which are at right angles to the first direction in which the abrasive belt 217 is driven into forceful engagement with the abrasive belt 217 along the support surface 223.

The workpiece feed means or mechanism preferably comprises a wheel 228 having axis 226, a generally cylindrical periphery 227; means in the form of an axle 229 for the wheel 228 journaled in bearings 230 on the frame means. The axle 229 mounts the wheel 228 on the frame means for rotation about the axis 226 at a right angle to the first direction in which the abrasive belt 217 is driven to sequentially move the periphery 227 of the wheel 228 past a loading station 233 relative to the frame means, and then past the support surface 223 of the platen 222. There is also present drive means for rotating the periphery 227 of the wheel 228 past the support surface 223 of the platen 222 at a uniform rate of rotation.

The belt grinding assembly 210 includes a plurality (preferably about sixteen 16) of object holder assemblies 300 (FIG. 14) having radially outward and inward sides. Each of the object holder assemblies 300 include engagement means for releasably engaging and holding a wrench 212 along its radially outward side.

Figure 18:
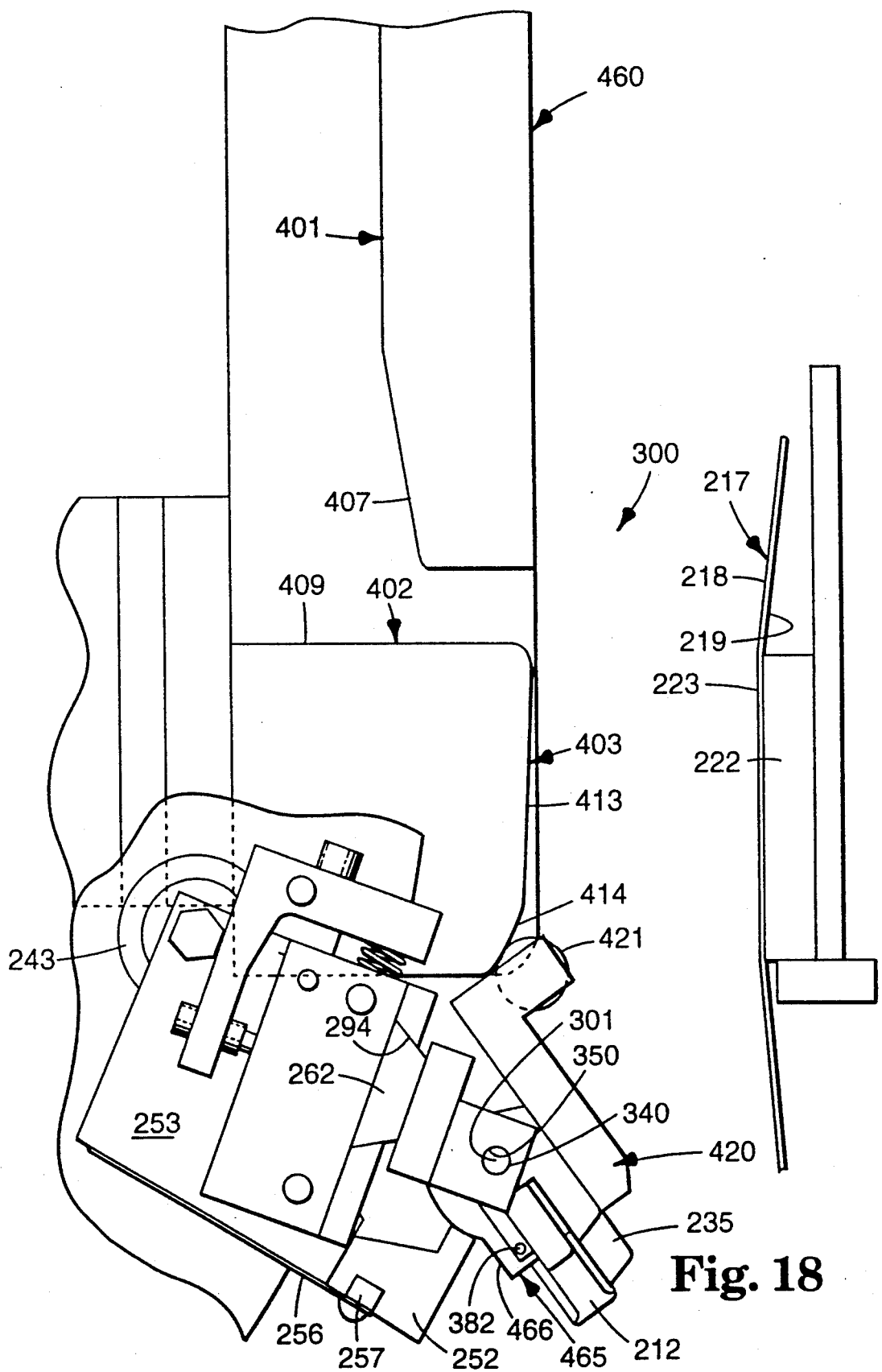

Pivotal mounting means or mechanisms are present for mounting the engagement means about engagement means axes 301 (FIG. 11) that are generally parallel to the wheel axis 226 and which are spaced about the peripheral portion of wheel 228. The pivotal mounting means mount each of the engagement means so that they project radially outwardly of the wheel 228 for pivotal movement about their respective engagement means axis 301 between a pre-grinding position (FIG. 15) and a post-grinding position (FIG. 18). The pivotal movement of the engagement means from the pre-grinding to the post-grinding position is generally in the first direction of the wheel 228.

Additionally, the grinding assembly 210 includes cam bar track means 460 attached to the frame means and located generally adjacent the support surface 223 for pivoting each engagement means from the pre-grinding position to the post-grinding position during movement of the engagement means past the back-up platen 222 to bring an object such as wrench 212 into forceful engagement with the abrasive belt 217 along the support surface 223 so that a radius may be ground on the wrench 212.

Figure 13:
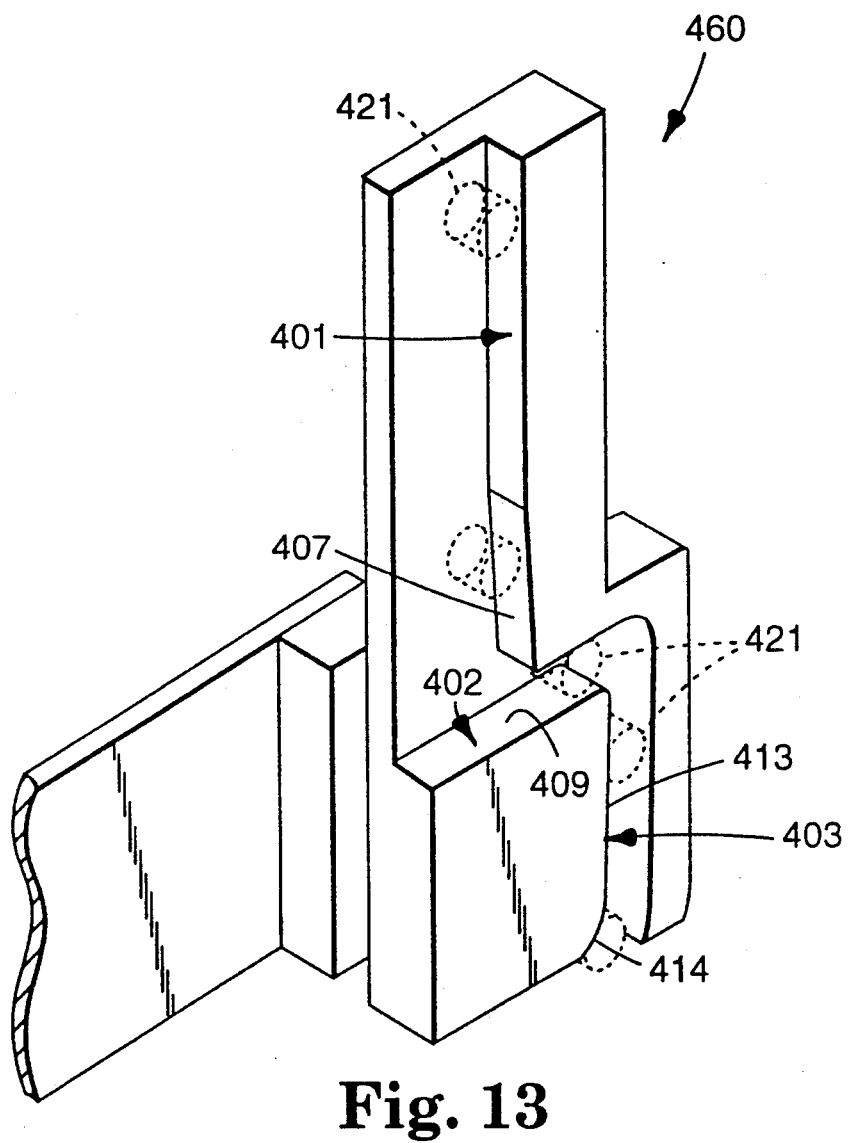
FIG. 13 is a perspective view of a cam bar track shown in solid lines and with a portion of a cam follower shown in dashed lines which sequentially illustrates the path of the cam follower along the cam track.
Figure 14:
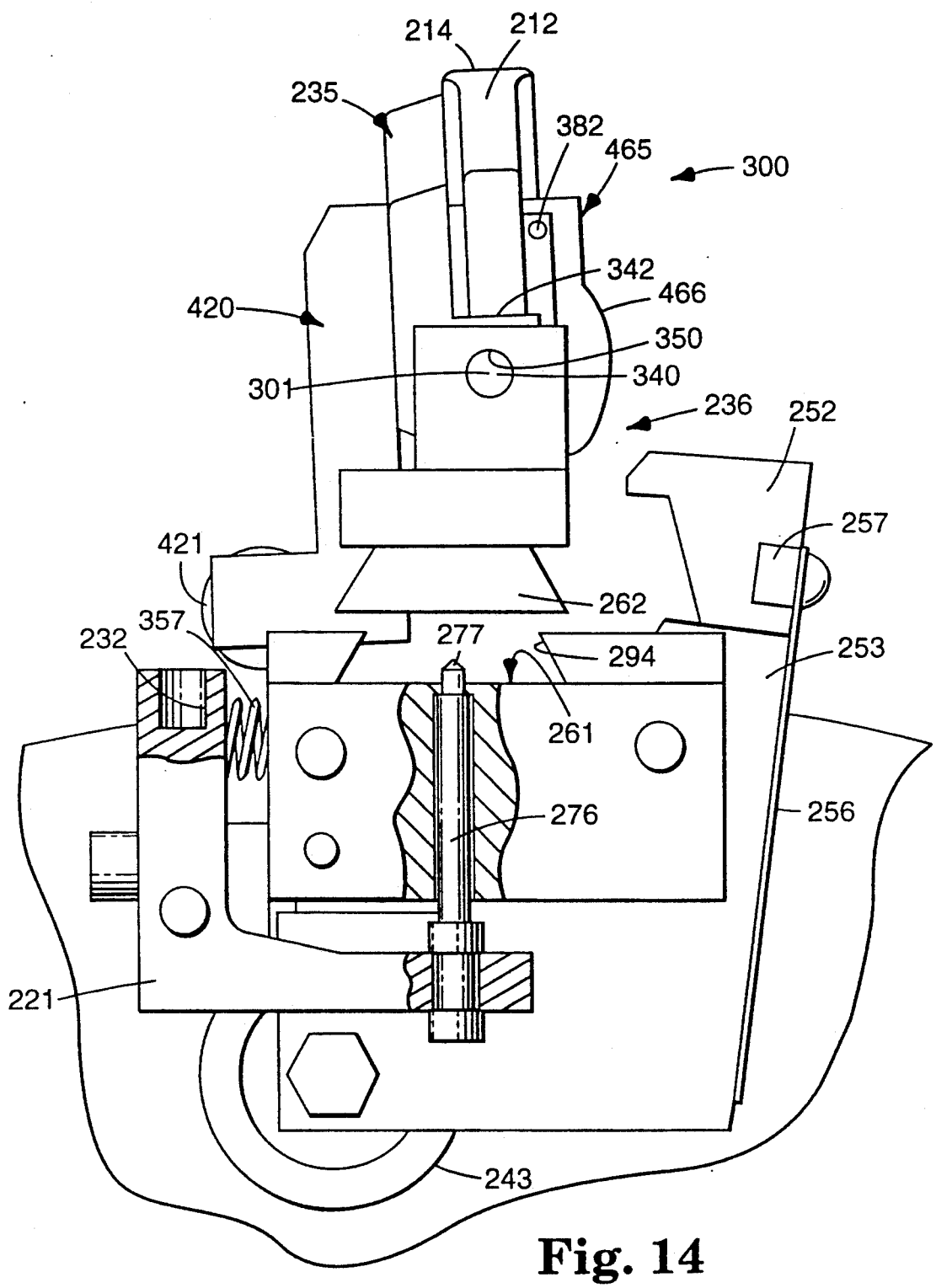
FIG. 14 is a sectional view of a tool holder assembly portion of the belt grinding assembly according to the present invention, and further illustrating an engagement means and portions of a pivoting means according to the present invention.
Figure 15:
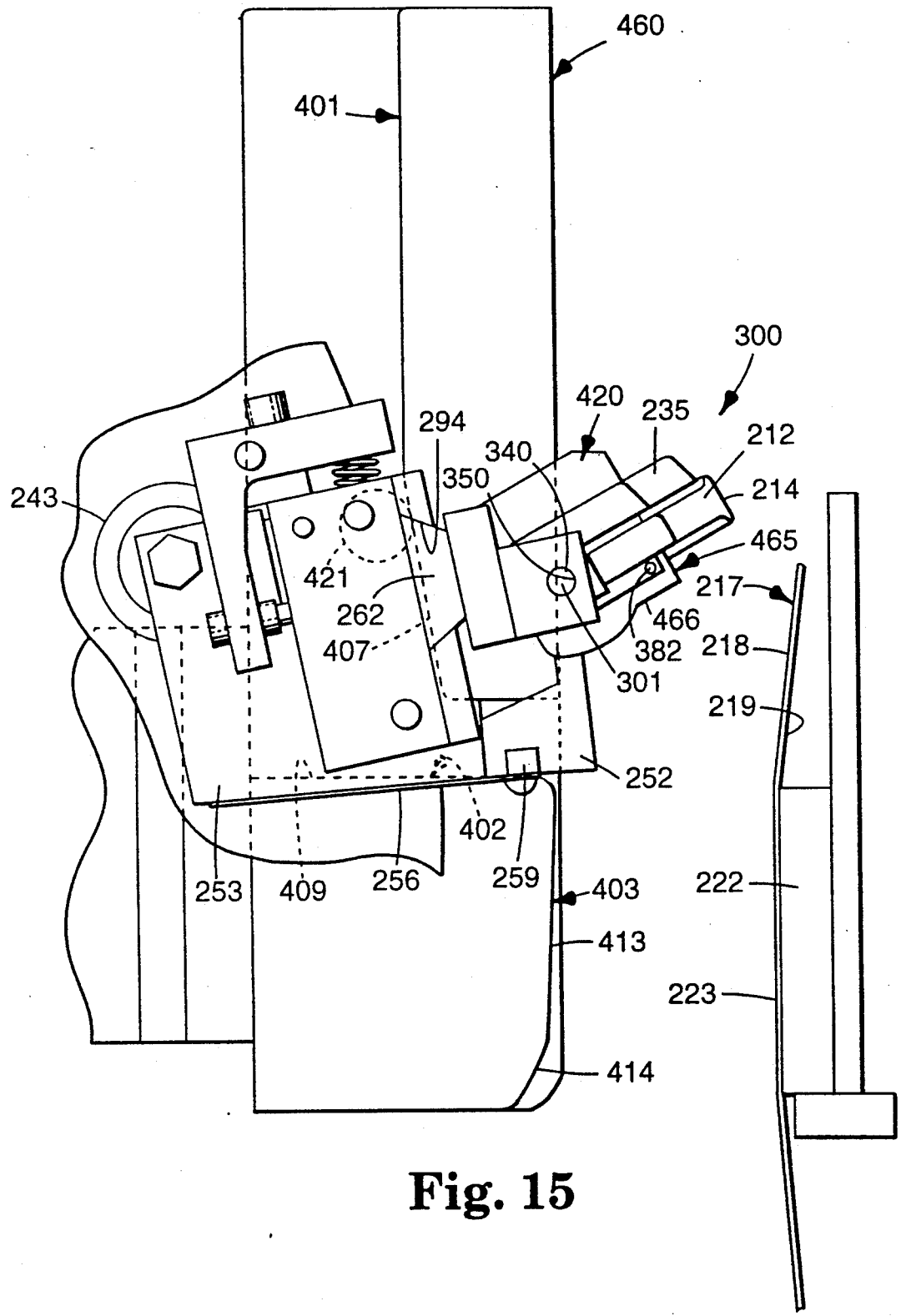
Figure 16:
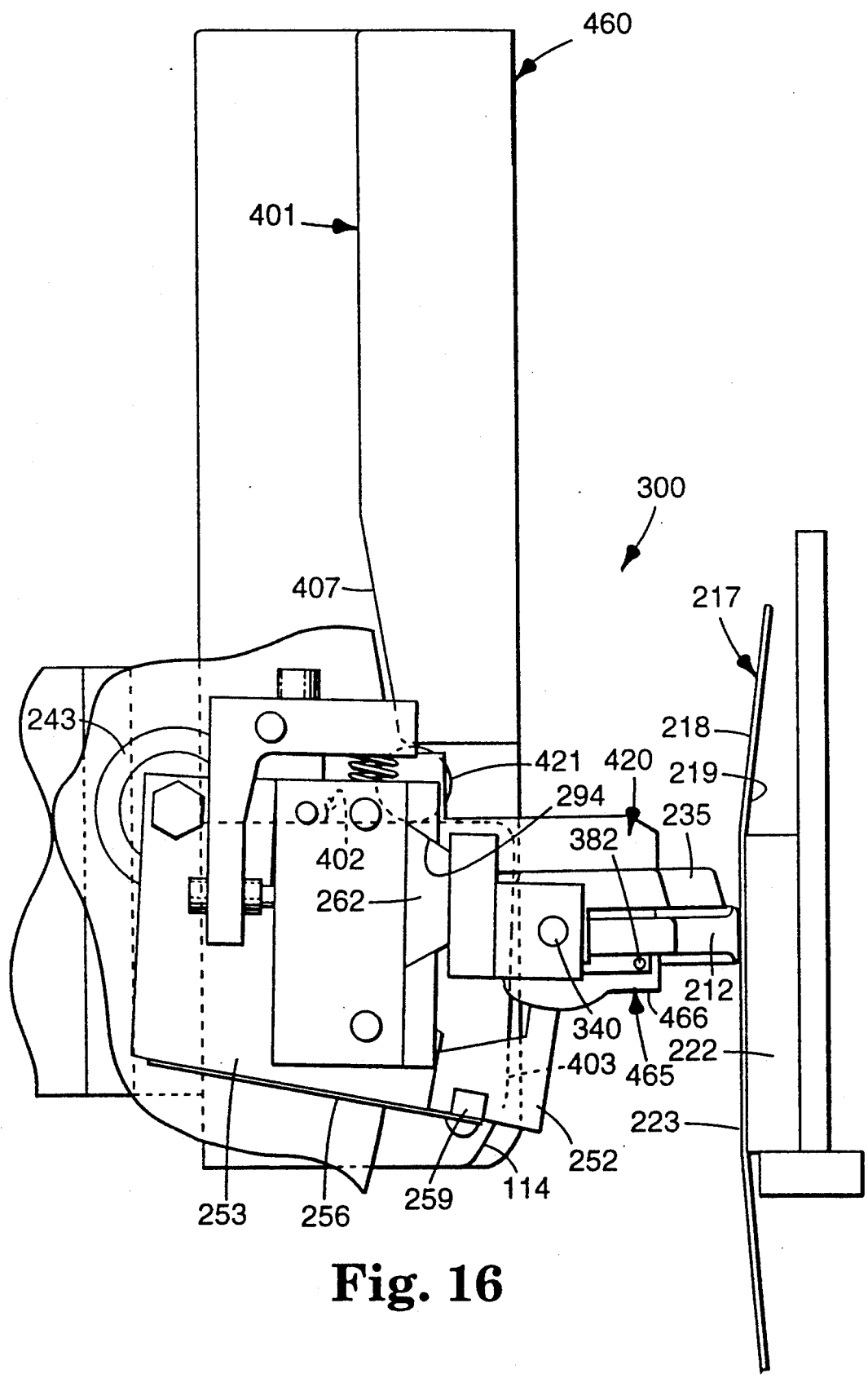

The cam bar track means 460 is preferably constructed from a strong, durable material such as steel, and is shown in its entirety in FIG. 13. Portions of the cam bar track 460 have been omitted in FIGS. 14 through 18 to emphasize details.

The cam bar track means 460 may be constructed from a stock piece that has an overall depth of one inch, and a maximum width of four and one-half (4.5) inches. The cam bar track 406 comprises first 401, second 402 and third 403 channel portions each having ends. The third channel portion 403 has a trailing surface 413 that preferably has a vertical length of approximately 3 and 5/8 inches and a chamfered end surface 414. The second channel portion 402 has a middle surface 409 that is situated relative to the trailing surface 413 at an included angle of about eighty-three (83) degrees and has a length of approximately four (4) inches. The first channel portion 401 has a lead in surface 407 that is situated at an included angle of about eighty-three degrees relative to the middle surface 409, and the first channel portion 401 has an overall length of approximately twelve (12) inches.

The cam bar track 460 may be adjusted (e.g. radially) relative to the wheel axis 226 to control the shape of the edge that is ground on the wrench 212. For example, the surface 409 of the cam track 460 may be located slightly above (e.g 5/8 of an inch) or below the wheel axis 226. A means such as a releasable collar 426 fastened about the wheel axis 226 affords such adjustment.

The wheel 226 comprises structure defining a slot 261 extending generally parallel to the wheel axis 226 and having an inlet opening at one end. The object holder assembly comprises a base 262 adapted for close fitting engagement in the slot 261, and means for releasably retaining the base 262 in the slot 261.

The radially outward side of each of the object holder assemblies 300 (in this species, this is also the outward side of wheel 226) has a peripheral surface. The slot 261 is defined by a part of the peripheral surface and at least one side or bearing surface 294 disposed at an acute angle relative to the periphery of the object holder assembly 300 (e.g. the wheel 226). Preferably the slot 261 comprises a dovetail slot but may comprise a slot having only one side disposed an acute angle relative to the outer surface of the object holder assembly 300.

The means for releasably retaining the base 262 in the slot 261 may include means for forcefully pressing the base 262 against side or bearing surfaces 294 of the slot 261.

The base or plate 262 has surfaces defining a socket opening through the bottom of the plate 262 and has shoulder surfaces adapted to engage the bearing surfaces 294. The means for forcefully pressing the base 262 against the bearing surfaces 294 of the slot 261 includes detent means 276 having detent surfaces 277 adapted to engage the surfaces defining the socket in the plate 262 to position the plate 262 at a predetermined location relative to the object holder assembly 300. The detent means 276 are mounted on the object holder assembly 300 for movement between a locking position with the detent surfaces 277 of the detent means 276 engaged with the socket surfaces in the plate 262, and a release position with the detent surfaces 277 of the detent means disengaged from the socket to afford sliding movement of the plate 262 within the slot 261.

A coil spring 357 may bias the detent surfaces 277 of the detent means 276 toward the locking position. The spring 357 also biases the shoulder surfaces of the plate 262 radially outward from the axis 226 toward engagement with the bearing surfaces 294 on the periphery of the slot 261 to provide secure frictional engagement between the shoulder surfaces of the plate 262 and the bearing surfaces 294 of the slot 261 to thereby firmly hold the plate 262 within the slot 261 while the new surface is formed on the wrench 212.

The coil spring 357 has two opposite ends with one end engaged with an L-shaped actuation member 221 and with the other end of the spring engaged with a base portion of the object holder assembly 300. The L-shaped actuation member 221 is an element of an actuation means which is provided for moving the detent means 276 from the locking position to the release position against the bias of the spring 357 and for overcoming the secure frictional engagement between the shoulder surfaces of the plate 262 and the bearing surfaces 294 of the slot 261 to thereby afford quick changing of the plate 262 and a tool receptacle (mentioned below) with a different plate and tool receptacle. The actuation means affords release of the bias from the spring 357 before the plate 262 is slid axially into or out of slot 261.

At its radially outer or upper end, the L-shaped actuating arm 221 includes surfaces defining a pair of apertures 232 which are adapted to receive a manual operable means (not shown) such as a fork shaped bar having two tangs projecting from a handle for moving the detent means 276 from the locking to the release position to afford changing of the plate 262 and the tool receptacle with a different plate and tool receptacle.

The above described detent, slot and actuation members are described in U.S. patent application Ser. No. 07/638,047 which is herein incorporated by reference in its entirety.

Each of the engagement means preferably comprises a cam follower 420 having a cam bar track engaging surface 421. The cam bar track engaging surface 421 preferably is a part of a wheel that is adapted to rotate relative to the cam follower 420. The engagement means also preferably comprises a cylindrical pivot rod or axle 340 projecting generally parallel to the engagement means axis 301. The rod 340 may comprise a single rod extending the length of the engagement means, or preferably, the rod 340 may comprise a pair of rods at each end of the engagement means.

The pivotal mounting means preferably comprises the base 262 having surfaces defining a pivot bore 350 for receiving the pivot rod 340 (or preferably a pair of bores at each end of the engagement means for receiving the rods). The pivot bore 350 affords pivotal movement of the engagement means relative to the engagement means axis 301.

Preferably the engagement means comprises a replaceable tool receptacle including the cam follower 420 having the cam bar track engaging surface 421, the pivot rod 340, and object receiving surfaces 342 adapted to receive and cooperate with the shape of the wrench 212. The tool receptacle may be replaced with a different tool receptacle with object receiving surfaces having a different shape to afford forming surfaces on different shaped wrench (e.g. a wrench having a different size or geometry). Preferably, the center longitudinal axis of the wrench is radially aligned with the axis 301.

The cam track engagement surface 421 engages the cam track 460 as the object holder assembly 300 moves past the backup platen 222. Engagement between the cam track 460 and surface 421 causes the engagement means to pivot about axis 301 as the engagement means moves past the backup platen 222. Pivoting the engagement means at this location affords grinding a small radius along the edge of the wrench 212 than would be ground without the pivoting of the engagement means.

Figure 17:
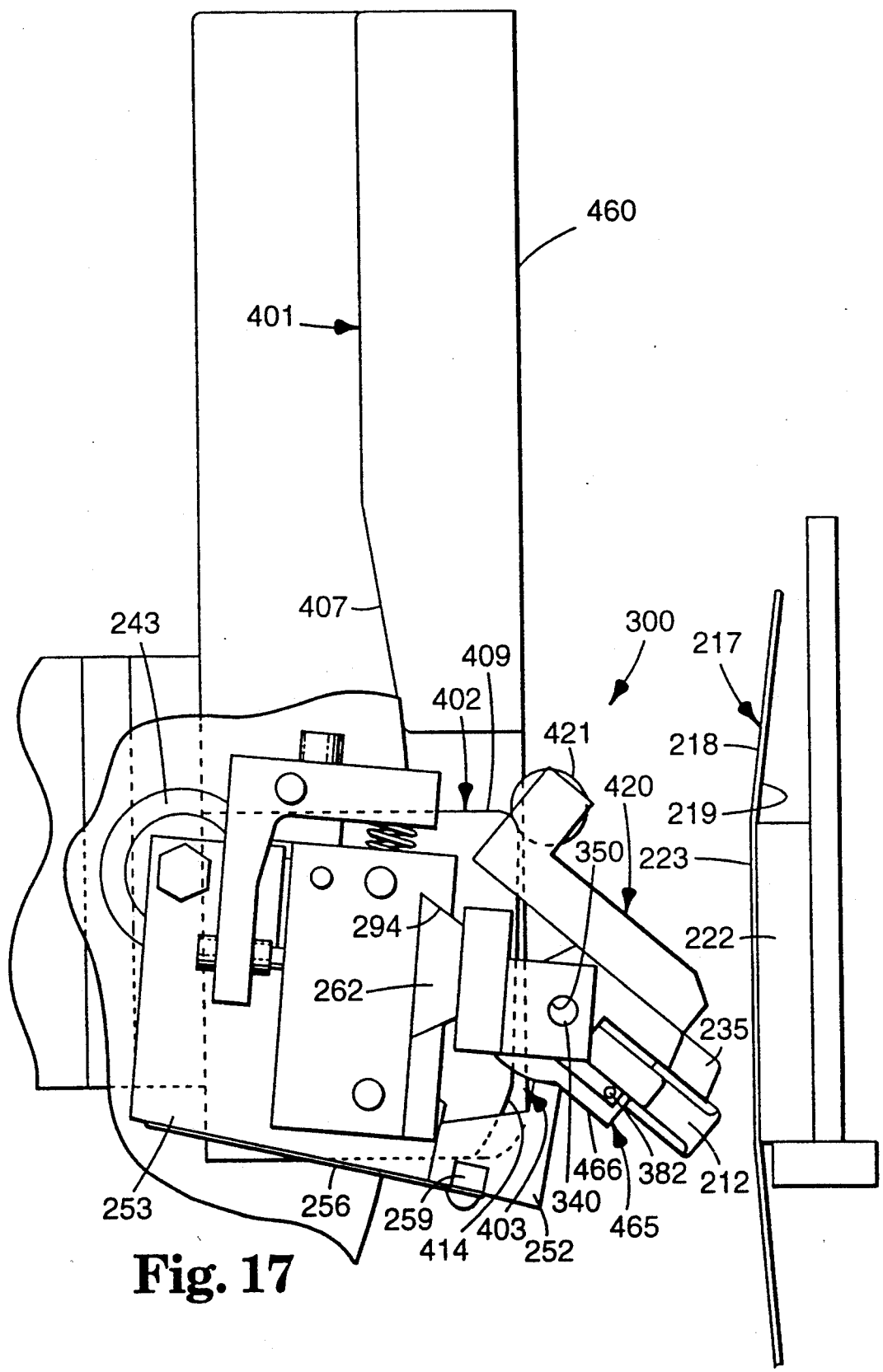

As the drive means rotates the wheel 228, cam track engagement surface 421 (1) initially engages a pre-grinding surface portion of the cam track 460 to move the engagement means to the pre-grinding position (FIG. 15), (2) then engages a grinding surface portion of the cam track 460 to cause the engagement means to pivot the wrench 212 relative to wheel 228 into forceful engagement with the machining means (FIG. 16), and (3) then engages a post-grinding surface portion of the track 460 to retain the wrench 212 spaced from the abrasive 217. As best seen in FIGS. 17 and 18, the cam bar track 460 ensures that the engagement means does not pivot the wrench 212 back into engagement with the belt 217 after the edge of the wrench 212 has been ground.

First and second spaced jaws 235 and 236 are mounted on the wheel 228 in spaced relationship about its periphery 227. The engagement means comprises the first jaw 235, the second jaw 236, and jaw actuation means (later to be explained) for mounting a portion of the second jaw 236 for movement relative to the first jaw 235 between a release position (see the jaws 235 and 236 at the loading station 233) with the jaws 235 and 236 spaced to freely receive a wrench 212 between the jaws 235 and 236, and an engage position (see the jaws adjacent the platen 222) adapted to firmly clamp the wrench 212 between the jaws 235 and 236, and means for positioning the jaws 235 and 236 in their engage position as each object holder assembly 300 moves past the support surface 223 of the platen 222.

For each engagement means, the second jaw 236 comprises several pieces (e.g. it is separable). Jaw 236 is mounted by means including a pivot pin (similar to the pivot pin 40 of FIG. 6) for pivotal movement relative to the object holder assembly 300 between the release and the engage positions.

The jaw actuating means includes a spring (not shown but similar to the spring 42 of FIGS. 4 and 10) between the first jaw 235 and the second jaw 236 for biasing the second jaw 236 toward the engage position of the jaws 235 and 236, and cam means including a cylindrical jaw cam follower 243 mounted on the second jaw 236 for rotation about an axis parallel to the axis 226 of the wheel 228, and first (e.g. a loading) and second (e.g. release) cams 245 and 246 mounted on the frame means. The cams 245 and 246 have cam surfaces positioned for engagement by the jaw cam followers 243 to position the second jaws 236 in the release positions of the jaws 235 and 236 when the jaws 235 and 236 are at the loading station 233 preceding the platen 222 or at an unloading station 248 subsequent to the platen 222 and fixed relative to the frame means along the lowermost portion of the wheel 228. The pairs of jaws 235 and 236 are moved from the release position at the loading station 233 to the engaged position. In the engaged position, the jaws 235 and 236 are moved past the support surface 223 of the platen 222 and then to unloading station 248 where they are again moved to the release position and the finished wrench 212 is dropped into a receptacle (not shown).

As mentioned above, the second jaw 236 is separable. As best seen in FIGS. 14–18, the second jaw comprises a lock bar 465 having a bearing surface 466. The lock bar 465 is preferably pivotally mounted to the tool receptacle by pin 382 for pivotal movement between a lock position (FIGS. 14–18) with the wrench firmly held between the bar 465 and the jaw 235 and a release position spaced from the jaw 235 to receive a wrench 212. Thus, the lock bar 465 portion of the second jaw 236 is separate from the remaining portions of the jaw 236 as it is connected to the tool receptacle.

Different shaped jaws 235 and 236 may thus be required or conveniently provided for different shaped wrenches, and the use of such different shaped jaws is facilitated by the means for releasably attaching the tool receptacle described above. There is also present a contact adapter 252 and means for changing the contact adapter 252 of the second jaw 236, best seen in FIGS. 14–18, comprising the second jaw 236 being separable from the lock bar 465 and having a major portion 253 mounted on the pivot pin (not shown but similar to pin 40 in FIG. 4) and on which major portion 253 the jaw cam follower 243 is mounted.

Sliding movement of the contact adapter 252 of the second jaw 236 against the bearing surfaces 466 of the lock bar 465 while the engagement means moves from the pre-grinding to the post-grinding position insures complete and firm contact of the second jaw 236 with the wrench 212 between the jaws 235 and 236. The contact adapter 252 of the second jaw 236 is retained in place on a pin (similar to 54) and against the major portion 253 by a leaf spring 256 having an end portion fixed on the major portion 253 of the second jaw 236, and carrying a lug 257 on its distal end adapted to engage over a lip on the adapter 252 of the second jaw 236. When desired, the adapter 252 can be easily replaced by an adapter or contact portion of a different shape by pulling the lug 257 out of the recess in the adapter 252 of the second jaw 236 against the bias of the leaf spring 256, lifting the adapter 252 off of the pin (e.g. similar to 54), positioning the new contact portion on the pin (e.g. similar to 54), and allowing the lug 257 to enter the recess in the new contact portion under the influence of the leaf spring 256 to retain it in place.

Figure 11:
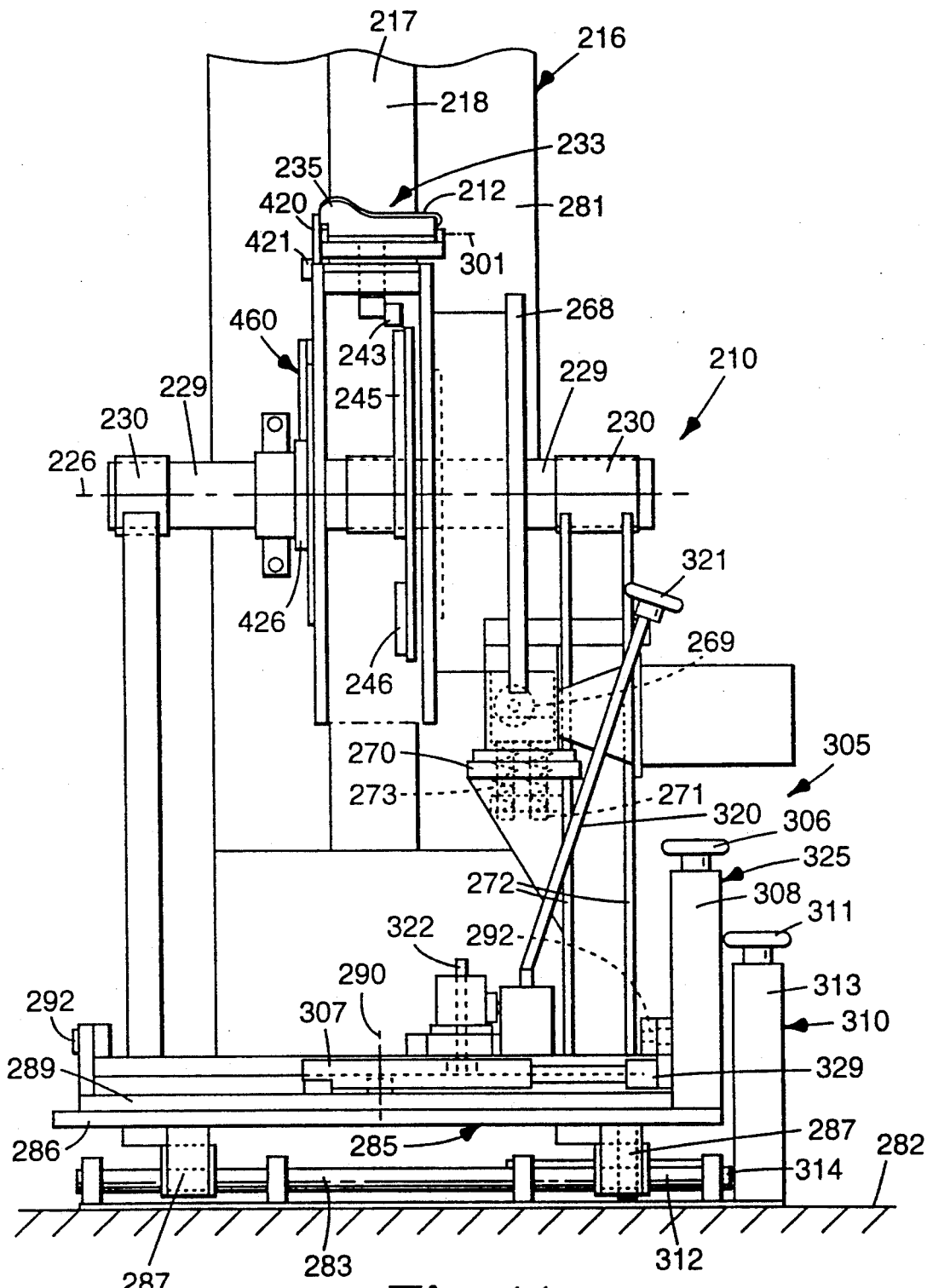
FIG. 11 is a fragmentary front vertical view of a second embodiment of belt grinding assembly according to the present invention, which view has parts broken away to show details.
Figure 12:
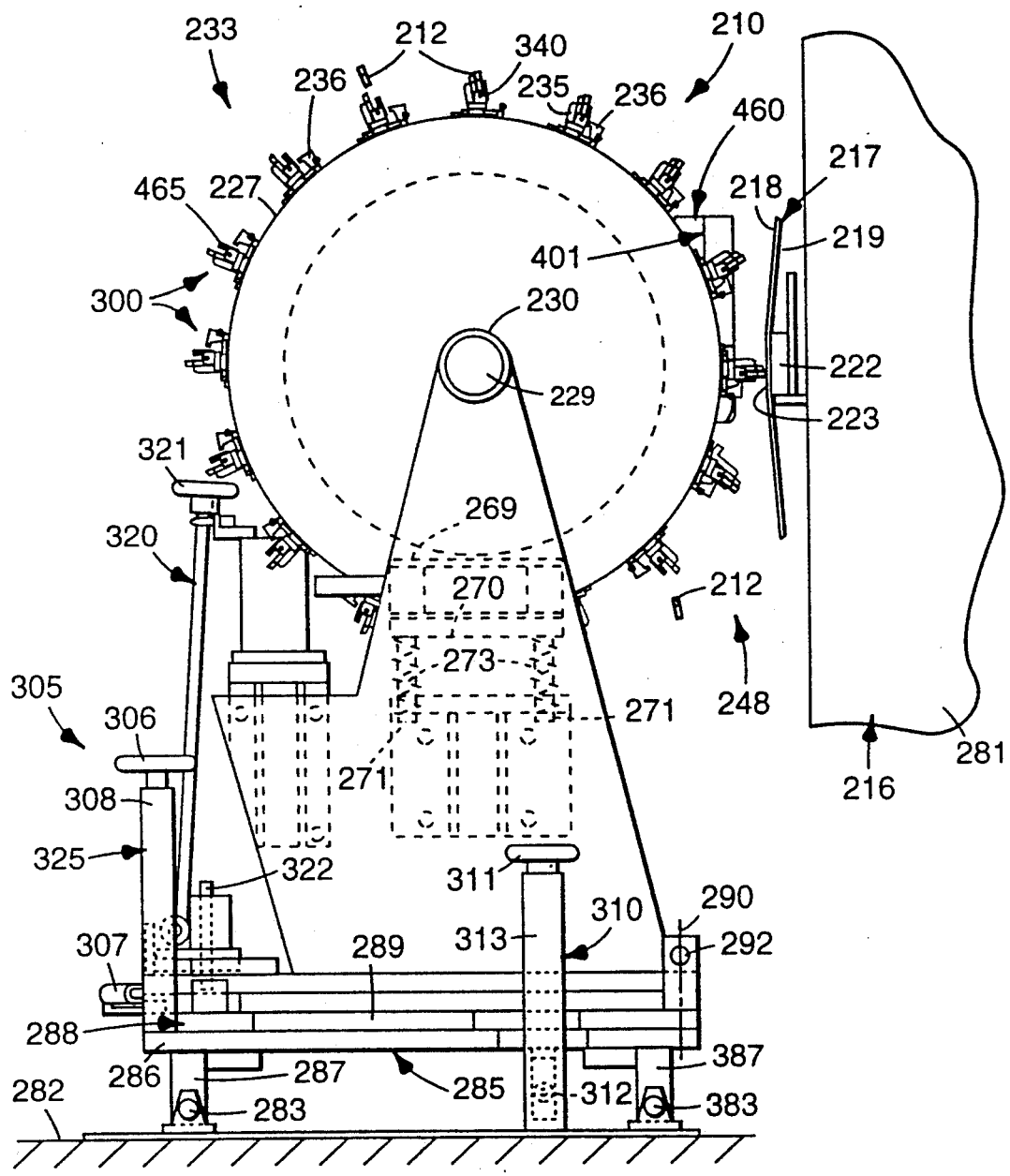
FIG. 12 is a fragmentary side vertical view of the belt grinding assembly of FIG. 11.

The release and loading cam surfaces 245 and 248 are also positioned for engagement by the jaw cam follower 243 to move the second jaw 236 to the release position. The jaw cam follower 243 is axially offset (relative to the wheel axis 226) from the cam follower 420 as best seen in FIG. 11.

The backup platen 222, which has a uniform shape corresponding to the shape of the edge surface 214 in a direction at a right angle to the first direction in which the abrasive belt 217 is driven, may be changed for different shaped wrenches or bars, and thus is removably attached to the frame means by bolts (not shown). The support surface 223 of the platen 222 along the path adjacent the rear surface of the abrasive belt 217 is covered with an about ⅛ inch thick layer of the graphite covered backing sold by Process Engineering Corporation, Crystal Lake, Ill., which facilitates sliding movement of the backing of the abrasive belt 217 along the fixed support surface 223 when the wrench 212 is pressed into forceful grinding engagement with the abrasive belt 217 moving over it. There may be an elastic resiliently deflecting material (e.g. foam rubber) behind the fixed support surface 223 which is adapted to conform to the shape of the wrench 212.

The wheel 228 has a predetermined diametrical dimension (e.g., 76 centimeters or 30 inches) at its periphery 227, and the drive means for rotating the periphery 227 of the wheel 228 past the support surface 223 of the platen 222 at a uniform rate of rotation comprises a helical gear 268 coaxial with and fixed to the wheel 228 (which helical gear 268 has diametrical dimension of about 61 centimeters or 24 inches, which is, as is preferred, within 25 centimeters or 10 inches of the diametrical dimension of the wheel 228), a worm gear 269 having an axis at a right angle to the axis 226 of the helical gear 268 and wheel 228, which worm gear 269 is engaged with the helical gear 268 and is driven by a variable speed motor (not shown), means for mounting the worm gear 269 for radial movement relative to the helical gear 268, and means for biasing the teeth of the worm gear 269 into close fitting engagement with the teeth of the helical gear 268 to restrict backlash between the gears 268 and 269. The means for mounting the worm gear 269 for radial movement relative to the helical gear 268 and the means for biasing the teeth of the worm gear 269 into engagement with the teeth of the helical gear includes a portion 270 of the frame means on which the worm gear 269 is rotatably mounted, which frame means portion 270 includes a plurality of parallel pins 271 projecting at a right angle to the axis of the worm gear 269 and received for longitudinal sliding movement in sockets in a portion 272 of the frame means on which the wheel 228 is mounted, and coil springs 273 around the pins 271 between the frame portion 272 on which the wheel 228 is mounted and the frame portion 270 on which the worm gear 269 is mounted.

Means in the form of relatively movable portions of the frame means and adjustable mechanisms between those portions are also provided for providing precise alignment between the wrench 212 in the engagement means and the support surface 223 so that the wrench 212 will be brought into the desired engagement with the abrasive belt 217 along the support surface 223 to form the desired radius on the edge surface 214. The relatively movable portions of the frame means include (1) a fixed portion comprising a frame 281 of the belt driving mechanism 216, a floor 282 on which the frame 281 is mounted in a fixed position, and two parallel rail assemblies 283 supported in a fixed position on the floor 282; (2) a transversely movable portion 285 comprising a transversely movable plate 286 and four linear bearing assemblies 287 projecting from a bottom surface of the plate 286, which linear bearing assemblies 287 are mounted around the rail assemblies 283 for linear movement there along; a horizontally pivotable portion 288 comprising a horizontal pivot plate 289 laying in face to face contact with the upper surface of the transversely movable plate 286 and mounted by a bolt through the plates 286 and 289 for horizontal pivotal movement relative to the transversely movable plate 286 about a vertical pivot axis 290 closely adjacent to and generally centered on the abrasive belt 217; and the portion 272 which is vertically pivotable relative to the pivot plate 286 about a horizontal axis parallel to the axis 226 of the wheel 228 that is defined by pivot pins 292 through the vertically pivotable portion 272 and the horizontal pivot plate 289 on the sides thereof adjacent the abrasive belt 217.

An adjustment assembly 320 manually operable by a wheel 321 is mounted on the vertically pivotable portion 272 of the frame means and includes a screw jack portion including a threaded axially movable rod 322 having a lower end bearing against horizontal pivot plate 289 (e.g., the screw jack commercially designated a "Jaculator" T.M. available from Minnesota Bearing, St. Paul, Minn.). Rotation of the wheel 321 changes the length of the portion of the rod 322 that extends between the vertically pivotable portion 272 and the horizontal pivot plate 289, thereby causing vertical pivotal movement of the vertically pivotable portion 272 relative to the horizontal pivot plate 289 about the pivot pins 292 and changing the engagement between the edge surface 214 of the wrench 212 and the abrasive belt 217 on the support surface 223 along the entire length of the wrench 212.

An adjustment screw assembly 305 is manually operable by a wheel 306 connected to a shaft rotatably mounted in a bearing block 308 mounted on the transversely movable plate 286 of the frame means, which shaft is coupled by a universal joint 329 to an extendible or retractable rod assembly 307 having an end attached to the horizontal pivot plate 289. Rotation of the wheel 306 provides means for changing the length of the rod assembly 222 (i.e., by screwing a threaded rod portion thereof into or out of an internally threaded socket portion thereof) thereby causing horizontal pivotal movement of the horizontal pivot plate 289 and the wheel 228 carried thereby about the vertical pivot axis 290 on the top surface of the transversely movable plate 286 to adjust the engagement of one end of the wrench 212 relative to the other with the abrasive belt 217 along the support surface 223.

An adjustment screw assembly 310 is manually operable by a wheel 311 connected to a shaft rotatably mounted in a bearing block 313 mounted on a plate fixed to the floor 282 on which the rail assemblies 283 are fixed, which shaft is coupled by a universal joint 314 to an extendible or retractable rod assembly 312 having an end attached to the transversely movable plate 286 of the frame means. Rotation of the wheel 311 provides means for changing the length of the rod assembly 312 (i.e., by screwing a threaded rod portion thereof into or out of an internally threaded socket portion thereof), thereby causing horizontal movement of the transversely movable plate 286 and the wheel 228 it supports through the pivotal portion 288 to adjust the area of contact between the wrench 212 and the abrasive belt 217 along the platen 222 in a direction parallel to the axis 226 of the wheel 228.

The present invention has now been described with reference to one embodiment thereof. It will be apparent to those skilled in the art that many changes can be made in the embodiment described without departing from the scope of the present invention. For example, when the grinding assembly is used to radius a straight edge portion on a bar or wrench, the abrasive belt used need not have a flexible backing. Instead of the platen 22, the abrasive belt 17 could be backed by a wheel having a specially shaped or cylindrical periphery, depending on the shape of the bar or wrench to be radiused. The backup platen may be omitted altogether and the abrasive belt 17 may be driven as a "slack belt" with only belt tension for support. Additionally, the unloading station 48 could be located at any position between the platen 22 and the loading station 33, or the operator could remove the finished tool at the loading station 33 before placing a wrench to be finished between the jaws 35 and 36. The actuating means for moving the jaws 35 and 36 between their release and engage positions could be provided by air or hydraulic operated mechanisms or by mechanical mechanisms other than the spring and cam mechanism illustrated. The radius of the wheel 28 can be large (e.g., 30 inches) to form an edge surface with a large radius on the edge of a wrench or bar being finished, or can be made smaller (e.g. 10 inches) to form an edge surface with a smaller radius on the edge of a wrench or bar being finished. The portion 72 of the frame means on which the wheel 28 is journaled could be movably mounted on rails disposed at a right angle to the axis 26 of the wheel 28 between the pivot plate 86 and the portion 72 rather than being vertically pivotable relative to the pivot plate 86 about the pivot pins 92. The belt grinding mechanism 16 illustrated could be replaced by a contact wheel about which the abrasive belt is moved so that the contact wheel would provide the backup platen, and the belt grinding assembly thus modified could be used for grinding surfaces other than edge surfaces on bars, such as to grind the gates or other projections off of castings or other objects. Thus the scope of the present invention should not be limited to the structure described in this application, but only by structures described by the language of the claims and the equivalents of those structures.

What is claimed is:

1. A grinding assembly for forming a new surface on an object, said grinding assembly comprising:
frame means;
machining means comprising:
means for grinding a workpiece,
means for driving said means for grinding a workpiece along a grinding path relative to said frame means;
workpiece feed means comprising a member having an arcuate peripheral portion having a workpiece feed axis and a workpiece feed radius defined from said workpiece feed axis;
means mounting said workpiece feed means on said frame means for rotation of at least a portion of said workpiece feed means about said workpiece feed axis along a workpiece feed path;
drive means for rotating at least a portion of the peripheral portion of said workpiece feed means past said machining means in a first direction; and
a plurality of object holder assemblies having radially outward and inward sides, each object holder assembly including engagement means for releasably engaging and holding an object, said object holder assemblies including:
pivotal mounting means for mounting said engagement means about engagement means axes that are generally parallel to the workpiece feed axis and which are spaced about the peripheral portion of said workpiece feed means;
said pivotal mounting means mounting each of said engagement means so that they project radially outwardly of said workpiece feed means for pivotal movement about their respective engagement means axis between a pre-grinding position and a post-grinding position with pivotal movement of said engagement means from said pre-grinding to said post-grinding position being generally in said first direction of said workpiece feed means;

cam bar track means generally adjacent said machining means for pivoting each engagement means from said pre-grinding position to said post-grinding position during movement of the engagement means past said machining means to bring an object into forceful engagement with the machining means.

2. A grinding assembly according to claim 1, wherein said means for grinding a workpiece comprises a continuous abrasive belt having a backing with front and rear surfaces, and abrasive granules attached along said front surface and backup means having a support surface for said belt along said workpiece feed path; and said workpiece feed means comprises:
a wheel having a periphery, a wheel axis at a right angle to said first direction, and a wheel radius defined from said wheel axis.

3. A grinding assembly according to claim 2 wherein each of said engagement means comprises movable clamp means comprising first and second jaws with said first jaw spaced from said second jaw for relative movement between a release position with said second jaw spaced freely from said first jaw to receive the object between said jaws, and an engage position adapted to firmly clamp the object between said jaws; and jaw actuating means for moving said movable jaws from said release position at a loading station, and for positioning said jaws in said engage position;

said jaw actuating means positions said jaws in said engage position as said clamp means moves past said support surface, and moves each of said first and second jaws to said release position at an unloading position fixed relative to said frame means along a lowermost portion of said workpiece feed means, and past which unloading position said pairs of jaws are moved after movement from said loading position past said machining means;

wherein said drive means sequentially moves the object holder assemblies past said loading station relative to said frame means, and then past said machining means.

4. A grinding assembly according to claim 1 wherein each of said engagement means includes a first Jaw, means for releasably attaching said first jaw to said object holder assembly to form a portion of the object holder assembly; a second jaw, and means for mounting a portion of said second jaw for pivotal movement relative to said first jaw between release and engage positions;

said object holder assembly including jaw actuating means including a spring between said jaws for biasing a portion of said second jaw toward said engage position, cam means including a jaw cam follower mounted on said second jaw and a cam mounted on said frame means, said cam having a cam surface positioned for engagement by said jaw cam follower to move said second jaw to said release position.

5. A grinding assembly according to claim 1 wherein said cam bar track means comprises pre-grinding, grinding and post-grinding surface portions, and each of said engagement means comprises a cam follower having a cam bar track engaging surface.

6. A grinding assembly according to claim 1 wherein said cam bar track is constructed from a cold rolled steel material and has an overall depth of one inch, a maximum width of four and one-half (4.5) inches, and said cam bar track comprises first, second and third channel portions each having ends, wherein:

the third channel portion has a trailing surface with a vertical length of approximately 3 and 5/8 inches and a chamfered end surface, the second channel portion has a middle surface that is situated relative to the trailing surface at an included angle of about eighty-three (83) degrees and has a length of approximately four (4) inches, the first channel portion has a lead in surface that is situated at an included angle of about eighty-three degrees relative to the middle surface, the first channel portion having an overall length of approximately twelve (12) inches, and means for adjusting the location of the cam bar track relative to the workpiece feed axis to control the shape of the surface ground on the object.

7. A grinding assembly according to claim 1 wherein said cam bar track comprises pre-grinding, grinding and post-grinding surface portions, said workpiece feed means comprises structural means for defining a slot extending generally parallel to said workpiece feed axis and having an inlet opening at one end, said object holder assembly comprises a base adapted for close fitting engagement in said slot, and means for releasably retaining said base in said slot, each of said engagement means comprises a cam follower having a cam bar track engaging surface, and a pivot rod projecting generally parallel to said engagement means axis, said pivotal mounting means comprising said base having surfaces defining a pivot bore for receiving said pivot rod, said pivot bore affording said pivotal movement of said engagement means relative to said engagement means axis, wherein as said drive means rotates said workpiece feed means, said engagement means cam track engagement surface (1) initially engages said pre-grinding surface portion of said cam track to move said engagement means to said pre-grinding position, (2) then engages said grinding surface portion of said cam track to cause the engagement means to pivot the object relative to workpiece feed means into forceful engagement with the machining means, and (3) then engages the post-grinding surface portion to retain the object spaced from the machining means.

8. A grinding assembly according to claim 1 wherein said workpiece feed means comprises a slot extending generally parallel to said workpiece feed axis and having an inlet opening at one end, said object holder assembly comprises a base adapted for close fitting engagement in said slot, and means for releasably retaining said base in said slot, each of said engagement means comprises a replaceable tool receptacle including a cam follower having a cam bar track engaging surface, a pivot rod projecting generally parallel to said engagement means axis, and object receiving surfaces adapted to receive and cooperate with the shape of the object to be ground such that the tool receptacle may be replaced with a different tool receptacle with object receiving surfaces having a different shape to afford forming surfaces on different shaped objects, said pivotal mounting means comprising said base having surfaces defining a pivot bore for receiving said pivot rod, said pivot bore affording said pivotal movement of said engagement means relative to said engagement means axis.

9. A grinding assembly according to claim 4 wherein said means for releasably attaching said first jaw to object holder assembly comprises said workpiece feed means having structural means for defining a slot extending generally parallel to said workpiece feed axis and having an inlet opening at one end, said first jaw having a base adapted for close fitting engagement in said slot, and means for releasably retaining said base in said slot.

10. A grinding assembly according to claim 8 wherein said tool receptacle comprises a first jaw and portion of a second jaw.

11. A belt grinding assembly for forming a new surface on an object, said grinding assembly comprising:
   frame means;
   a belt grinding mechanism comprising:
      a continuous abrasive belt having a backing with front and rear surfaces, and abrasive granules attached along said front surface;
      means for driving said abrasive belt i a first direction along a path relative to said frame means;
      backup means having a support surface for said belt along said path;
      a wheel having a periphery, a wheel axis at a right angle to said first direction, and a wheel radius defined from said wheel axis;
      means mounting said wheel on said frame means for rotation about said wheel axis;
      drive means for rotating the periphery of said wheel past said support surface at a uniform rate of speed and in a first rotational direction;
   a plurality of object holder assemblies having radially outward and inward sides, each object holder assembly including engagement means for releasably engaging and holding an object along said radially outward side, said object holder assemblies including:
   pivotal mounting means for mounting said object holder assemblies about object holder assembly axes that are parallel to the axis of the wheel and which are spaced about the periphery of said wheel;
   said pivotal mounting means mounting each of said object holder assemblies with said engagement means projecting radially outwardly of said wheel for pivotal movement about said object holder axis between a pre-grinding position and a post-grinding position with pivotal movement of said object holder assembly from said pre-grinding to said post-grinding position being generally in said firs rotational direction of said wheel;
   biasing means for biasing each object holder assembly toward said pre-grinding position;
   pivoting cam means generally adjacent said support surface for pivoting each object holder assembly from said pre-grinding position to said post-grinding position against the bias of said biasing means during movement of the object holder assembly past said back-up means to bring an object into forceful engagement with the abrasive belt along said support surface so that a radius may be ground on the object.

12. A belt grinding assembly according to claim 11 wherein each of said engagement means comprises
   movable clamp means comprising first and second jaws with said first jaw spaced from said second jaw for relative movement between a release position with said second jaw spaced freely from said fist jaw to receive the object between said jaws, and an engage position adapted to firmly clamp the object between said jaws; and
   jaw actuating means for moving said movable clamp means to the release position at a loading station comprising a release cam surface mounted on said frame means,
   a spring mounted between said jaws for positioning said jaws in said engage position during movement of said object holders past said support surface;
   said jaw actuating means moving said first jaw to said release position at said loading station, positions said first jaw in said engage position as said clamp means moves past said support surface, and moves said first jaw to said release position at an unloading position fixed relative to said frame means along the lowermost portion of said wheel, and past which unloading position said pairs of jaws are moved after movement from said loading position past said support surface;
   wherein said drive means moves the object holder assemblies past said loading station relative to said frame means, then past said support surface, and then past said unloading station.

13. A belt grinding assembly according to claim 11 wherein
   said pivoting cam mans comprises a cam bar mounted on said frame means and adapted to engage said pivotal mounting means, and
   each of said engagement means includes a first jaw, means for releasably attaching said first jaw to the radially outward side of said object holder assembly in a position fixed relative to said object holder assembly; a second jaw, and jaw actuation means for mounting said second jaw on said object holder assembly for movement relative to said first jaw between a release position with said second jaw spaced freely from said fist jaw to receive the object between said jaws, and an engage position adapted to firmly clamp the object between said jaws;
   said jaw actuating means includes a spring between said jaws for biasing said second jaw toward said engage position, cam means including a jaw cam follower mounted on said second jaw; and
   release and loading cams mounted on said frame means and axially offset from said cam bar, said release and loading cams having cam surfaces positioned for engagement by said jaw cam follower to move said second jaw to said release position against the bias of said spring biasing said second jaw toward said engage position.

14. A belt grinding assembly according to claim 13 wherein each of said plurality of object holder assemblies includes leveling means comprising a leveling cam follower mounted on said radially inward side of said object holder assembly,
   said release and loading cams having surfaces positioned for engagement by said leveling cam follower to fix said object holder assembly relative to said wheel, and said release and loading cam surfaces also having surfaces positioned for engagement by said jaw cam follower to move said second jaw to said release position and to level said object holder assembly in a leveled position generally midway between said pre-grinding and said post-grinding positions against the bias of said biasing means for biasing each object holder assembly toward said pre-grinding position.

15. A belt grinding assembly according to claim 13 wherein said means for releasably attaching said first jaw to the radially outward side of said object holder assembly comprises structural means on the radially outward side of each of said object holder assemblies for defining a lost extending generally parallel to said wheel axis and having an inlet opening at one end, said first jaw having a base for close fitting engagement in said slot, and means for releasably retaining said base in said slot.

16. A belt grinding assembly according to claim 15 wherein said radially outward side of each of said object holder assemblies has a peripheral surface, said slot is defined by a par of said peripheral surface and at least one side surface disposed at an acute angle relative to the periphery of said object holder assemblies, and said means for releasably retaining includes means of forcefully pressing said base against said side surface.

17. A belt grinding assembly according to claim 11 wherein said biasing means for biasing each object holder assembly toward said pre-grinding position comprises a plurality of coil springs each having a pair of ends, with one end of said coil springs attached to a position on said wheel generally adjacent said wheel axis and with the other end of said coil springs being attached to the radially inward side of one of said object holder assemblies.

18. A belt grinding assembly according to claim 11 wherein said pivotal mounting means comprises generally V-shaped cam followers mounted on each of said object holder assemblies, said V-shaped cam followers having leading and trailing portions having surfaces adapted to engage said pivoting cam means while said object holder assembly is pivoted from said pre-grinding to said post-grinding position to thereby bring the object into forceful engagement with the abrasive belt along the support surface, and said leading and trailing surfaces of said V-shaped cam follower diverging to prevent the workpiece from being thrown from the engagement means when the object holder assembly is pivoted from said post-grinding to said pre-grinding position after the object has been ground.

19. A belt grinding assembly according to claim 11 wherein said pivoting cam means comprises a cam bar mounted on said frame means and adapted to engage said pivotal mounting means, said pivotal mounting means comprises generally V-shaped cam followers mounted on each of said object holder assemblies, said V-shaped cam followers having leading and trailing portions having surfaces adapted to engage said cam bar while said holder assembly is moved from said pre-grinding to said post-grinding position to thereby bring the object into forceful engagement with the abrasive belt along the support surface, and said leading and trailing surfaces of said V-shaped cam follower diverges to prevent the workpiece from being thrown from the engagement means when the object holder assembly is pivoted from said post-grinding to said pre-grinding position after the object has been ground.

20. A belt grinding assembly according to claim 19 wherein said cam bar has a width of approximately 1.5 inches.

21. A grinding assembly for forming a new surface on an object, said grinding assembly comprising:

frame means;

machining means comprising:

means for grinding a workpiece, means for driving said means for grinding a workpiece along a grinding path relative to said frame means; and workpiece feed means comprising a member having an arcuate peripheral portion having a workpiece feed axis and a workpiece feed radius defined from said workpiece feed axis;

means mounting said workpiece feed means on said frame means or rotation of at least a portion of said workpiece feed means about said workpiece feed axis along a workpiece feed path;

drive means for rotating at least a portion of the peripheral portion of said workpiece feed means past said machining means in a first direction; and a plurality of object holder assemblies having radially outward and inward sides, each object holder assembly including engagement means for releasably engaging and holding an object along said radially outward side, said object holder assemblies including:

pivotal mounting means for mounting said object holder assemblies about object holder assembly axes that are parallel to the workpiece feed axis and which are spaced bout the peripheral portion of said workpiece feed means;

said pivotal mounting means mounting each of said object holder assemblies with said engagement means projecting radially outwardly of said workpiece feed means for pivotal movement about said object holder axis between a pre-grinding position and a post-grinding position with pivotal movement of said object holder assembly from said pre-grinding to said post-grinding position being generally in said first direction of said workpiece feed means;

cam means generally adjacent said machining means for pivoting each object holder assembly from said pre-grinding position to said post-grinding position during movement of the object holder assembly past said machining means to bring an object into forceful engagement with the machining means so that a radius may be ground on the object.

22. A grinding assembly according to claim 21, wherein said means for grinding a workpiece comprises a continuous abrasive belt having a backing with front and rear surfaces, and abrasive granules attached along said front surface and backup means having a support surface for said belt along said workpiece feed path; and said workpiece feed means comprises:

a wheel having a periphery, a wheel axis at a right angle to said first direction, and a wheel radius defined from said wheel axis, and said grinding assembly includes biasing means for biasing each object holder assembly toward said pre-grinding position.

23. A grinding assembly according to claim 21 wherein each of said engagement means comprises
movable clamp means comprising first and second jaws with said first jaw spaced from said second jaw for relative movement between a release position with said second jaw spaced freely from said first jaw to receive the object between said jaws, and an engage position adapted to firmly clamp the object between said jaws; and
jaw actuating means for moving said movable jaws from said release position at a loading station and for position said jaws in said engage position during movement of said object holders past said machining means;
said jaw actuating means moves each of said first and second jaws to said release position at said loading station, positions said jaws in said engage position as said clamp means moves past said support surface, and moves each of said first and second jaws to said release position at an unloading position along the lowermost portion of said workpiece feed means, and past which unloading position said pairs of jaws are moved after movement from said loading position past said machining means;
wherein said drive mans sequentially moves the object holder assemblies past said loading station and then past said machining means.

24. A grinding assembly according to claim 21 wherein each of said engagement means includes a first jaw, means for releasably attaching said first jaw to the radially outward side of said object holder assembly in a position fixed relative to said object holder assembly; a second jaw, and means or mounting said second jaw on said object holder assembly for pivotal movement relative to said fit jaw between said release and said engage positions; said jaw actuating means includes a spring between said jaws for biasing said second jaw toward said engage position, cam means including a jaw cam follower mounted on said second jaw and a cam mounted on said frame means, said cam having a cam surface positioned for engagement by said jaw cam follower to move said second jaw to said release position.

25. A grinding assembly according to claim 24 wherein each of said plurality of object holder assemblies includes leveling means comprising cam means including a leveling cam followers mounted on said radially inward side of said object holder assembly and said cam mounted on said frame means,
said cam surface positioned for engagement by said leveling cam follower and said jaw cam follower to move said second jaw to said release position and to level said object holder assembly in a leveled position generally midway between said pre-grinding and said post-grinding positions relative to said workpiece feed means.

26. A grinding assembly according to claim 24 wherein said means for releasably attaching said first jaw to the radially outward side of said object holder assembly comprises structural means on the radially outward side of each of said object holder assemblies for defining a slot extending generally parallel to said wheel axis and having an inlet opening at one end, said first jaw having a base of close fitting engagement in said slot, and means for releasably retaining said base in said slot.

27. A grinding assembly according to claim 26 wherein said radially outward side of each of said object holder assemblies has a peripheral surface, said slot is defined by a part of said peripheral surface and at least one side surface disposed at an actuate angle relative to the periphery of said object holder assemblies, and said means or releasably retaining includes means for forcefully pressing said base against said side surface.

28. A belt grinding assembly according to claim 21 wherein said biasing means for biasing each object holder assembly toward said pre-grinding position comprises a plurality of coil springs, each of said coil springs having a pair of ends, with one end of each of said coil springs attached to a position on said workpiece feed means and with the other end of each of the said col springs being attached to the radially inward side of one of said object holder assemblies.

* * * * *

UNITED STATES PATENT AND TRADEMARK OFFICE
CERTIFICATE OF CORRECTION

PATENT NO. : 5,305,555

DATED : April 26, 1994

INVENTOR(S) : Arthur P. Luedeke, Bradley W. Keller and Robert P. Miller

It is certified that error appears in the above-indentified patent and that said Letters Patent is hereby corrected as shown below:

Col. 1, line 10, "7" should read --8--.
Col. 6, lines 13 & 14, "'Three-M-itell" should read --"Three-M-ite"--.
Col. 13, lines 11 & 12, "'Three-M-itell" should read --"Three-M-ite"--.
Col. 21, line 48, "Jaw" should read --jaw--.
Col. 22, line 1, "I" should read --1--.
Col. 23, line 28, "i" should read --in--.
Col. 24, line 9, "fist" should read --first--.
Col. 24, line 35, "mans" should read --means--.
Col. 25, line 17, "lost" should read --slot--.
Col. 25, line 25, "par" should read --part--.
Col. 26, line 39, "bout" should read --about--.
Col. 27, line 14, after "station" insert --,--.
Col. 27, line 28, "mans" should read --means--.

UNITED STATES PATENT AND TRADEMARK OFFICE
CERTIFICATE OF CORRECTION

PATENT NO. : 5,305,555

DATED : April 26, 1994

INVENTOR(S) : Arthur P. Luedeke, et al

It is certified that error appears in the above-indentified patent and that said Letters Patent is hereby corrected as shown below:

Col. 28, line 41, "col" should read --coil--.

Signed and Sealed this

Twenty-first Day of February, 1995

Attest:

BRUCE LEHMAN

*Attesting Officer*          *Commissioner of Patents and Trademarks*